United States Patent
Imaoka

(10) Patent No.: US 10,341,612 B2
(45) Date of Patent: Jul. 2, 2019

(54) METHOD FOR PROVIDING VIRTUAL SPACE, AND SYSTEM FOR EXECUTING THE METHOD

(71) Applicant: COLOPL, Inc., Tokyo (JP)

(72) Inventor: Yujin Imaoka, Tokyo (JP)

(73) Assignee: COLOPL, INC., Tokyo (JP)

(*) Notice: Subject to any disclaimer, the term of this patent is extended or adjusted under 35 U.S.C. 154(b) by 0 days.

(21) Appl. No.: 15/854,675

(22) Filed: Dec. 26, 2017

(65) Prior Publication Data

US 2018/0262717 A1 Sep. 13, 2018

(30) Foreign Application Priority Data

Dec. 27, 2016 (JP) .................................. 2016-253289

(51) Int. Cl.
| | |
|---|---|
| *G06T 15/00* | (2011.01) |
| *H04N 7/15* | (2006.01) |
| *G02B 27/01* | (2006.01) |
| *H04L 12/18* | (2006.01) |
| *G06T 19/00* | (2011.01) |

(Continued)

(52) U.S. Cl.
CPC .......... H04N 7/157 (2013.01); *G02B 27/017* (2013.01); *G06F 3/01* (2013.01); *G06Q 50/10* (2013.01); *G06T 19/003* (2013.01); *H04L 12/1822* (2013.01)

(58) Field of Classification Search
CPC .......... G06F 13/00; G06F 3/01; G06F 3/0481; G06Q 50/10; G06T 19/003; G06T 19/00; H04N 7/157; G02B 27/017; H04L 12/1822

USPC ........................................................ 345/418
See application file for complete search history.

(56) References Cited

U.S. PATENT DOCUMENTS

| | | | | |
|---|---|---|---|---|
| 7,203,674 B2 * | 4/2007 | Cohen | .................... | G06Q 10/02 |
| 7,890,984 B2 * | 2/2011 | Glashow | ............ | H04N 7/17318 |
| | | | | 725/86 |

(Continued)

OTHER PUBLICATIONS

Xia P, Liu B, Sun Y, Chen C. Reciprocal recommendation system for online dating. InProceedings of the 2015 IEEE/ACM International Conference on Advances in Social Networks Analysis and Mining 2015 Aug. 25, 2015 (pp. 234-241). ACM.*

(Continued)

*Primary Examiner* — Phu K Nguyen

(74) *Attorney, Agent, or Firm* — Hauptman Ham, LLP

(57) ABSTRACT

A method includes defining a virtual space for each of a first and second user. The method further includes presenting in a first virtual space a plurality of first potential match users as candidates to be matched with the first user. The method further includes detecting a first input from the first user and detecting a first period during which the first user designates the second user. The method further includes presenting in a second virtual space presenting a plurality of second potential match users as candidates to be matched with the second user. The method further includes detecting a second input from the second user and detecting a second period during which the second user designates the first user. The method further includes matching the first user and the second user in accordance with the first period and the second period satisfying a predetermined relation.

20 Claims, 30 Drawing Sheets

(51) Int. Cl.
*G06F 3/01* (2006.01)
*G06Q 50/10* (2012.01)

(56) References Cited

U.S. PATENT DOCUMENTS

| | | | | |
|---|---|---|---|---|
| 7,958,117 | B2* | 6/2011 | Pettinati | G06Q 50/10 705/319 |
| 8,117,132 | B2* | 2/2012 | Dean | G06Q 10/10 705/14.39 |
| 8,812,519 | B1* | 8/2014 | Bent | G06Q 30/0269 705/319 |
| 8,935,295 | B2* | 1/2015 | Malloy | H04L 41/5035 707/802 |
| 9,355,358 | B1* | 5/2016 | Kramer | G06N 5/02 |
| 9,503,547 | B2* | 11/2016 | Pedraza | H04L 67/306 |
| 9,609,072 | B2* | 3/2017 | Louis | H04L 67/22 |
| 9,934,297 | B2* | 4/2018 | Taylor | G06Q 30/02 |
| 10,025,835 | B2* | 7/2018 | Lerner | G06F 17/30554 |

OTHER PUBLICATIONS

Xia P, Zhai S, Liu B, Sun Y, Chen C. Design of reciprocal recommendation systems for online dating. Social Network Analysis and Mining. Dec. 1, 2016;6(1):32.*

Yu M, Zhang X, Kreager D. New to online dating?: learning from experienced users for a successful match. InProceedings of the 2016 IEEE/ACM International Conference on Advances in Social Networks Analysis and Mining Aug. 18, 2016 (pp. 467-470). IEEE Press.*

Obada-Obieh B, Somayaji A. Can I believe you?: Establishing Trust in Computer Mediated Introductions. InProceedings of the 2017 New Security Paradigms Workshop on ZZZ Oct. 1, 2017 (pp. 94-106). ACM.*

Votice of Allowance in JP Application No. 2016-253289, dated Aug. 22, 2017, 5pp.

Jordan Crook, "Dating App Coffee Meets Bagel Lands $7.8 Million in Series A", posted Feb. 18, 2015, retrieved from Internet on Dec. 24, 2017, https://techcrunch.com/2015/02/18/dating-app-coffee-meets-bagel-lands-7-8-million-in-series-a/, Oath Tech Networks, 6pp.

Romain Dillet, "Happn Atracts $14 Million for Its Dating App Powered by Real Life Interactions", posted Sep. 30, 2015, retrieved from Internet on Dec. 24, 2017, https://techcrunch.com/2015/09/30/happn-attracts-14-million-for-its-dating-app-powered-by-real-life-interactions/, Oath Tech Networks, 6pp.

* cited by examiner

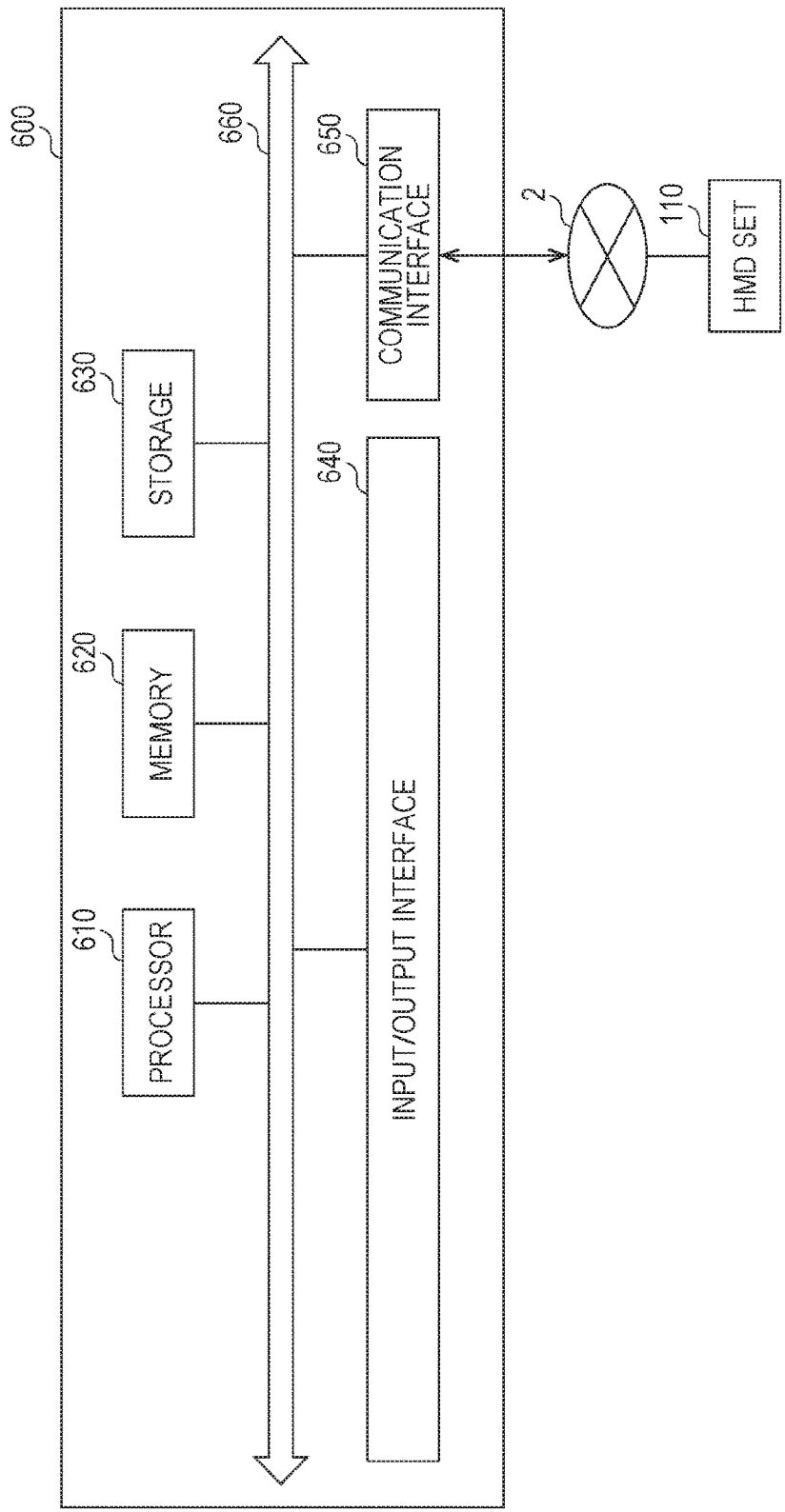

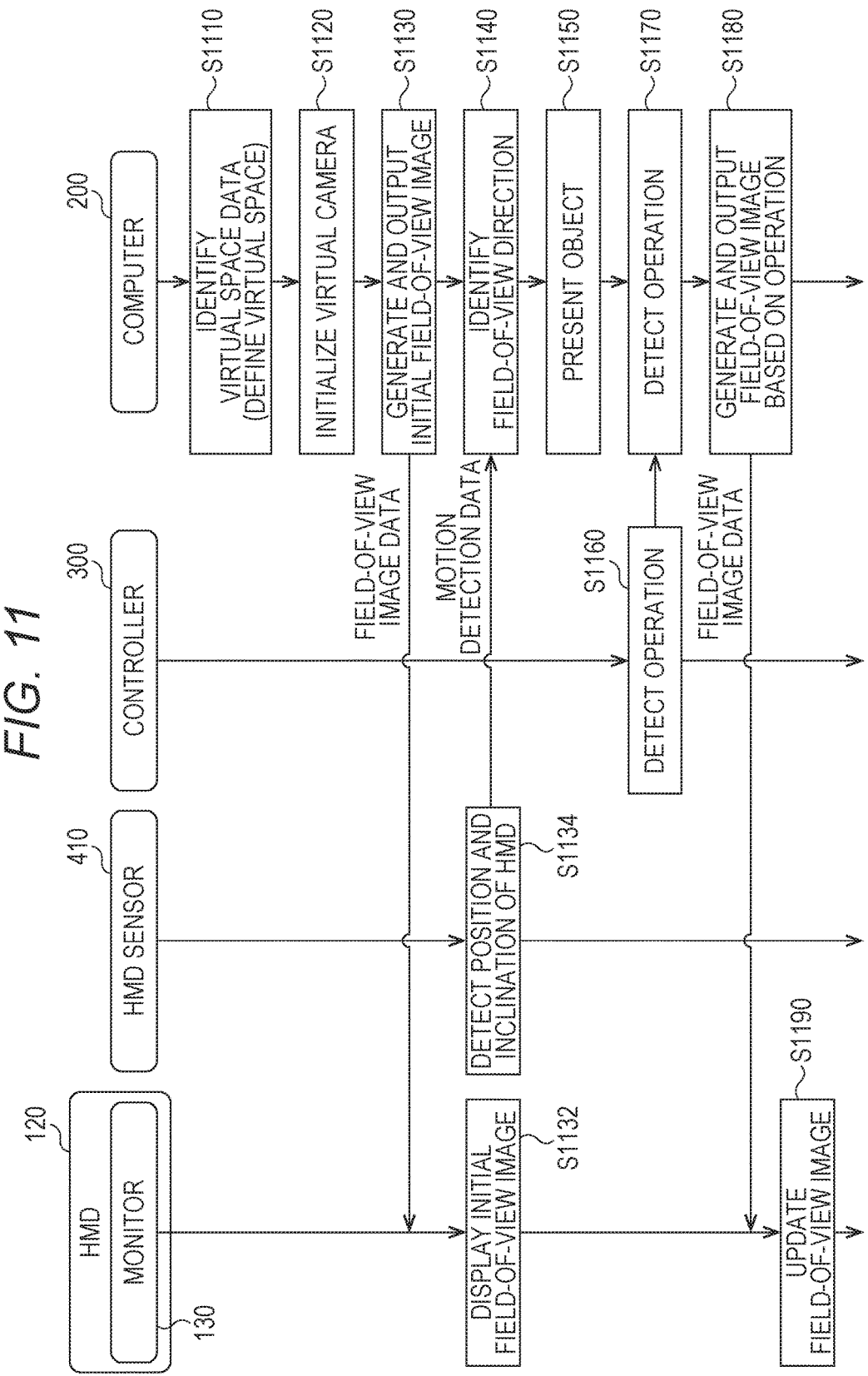

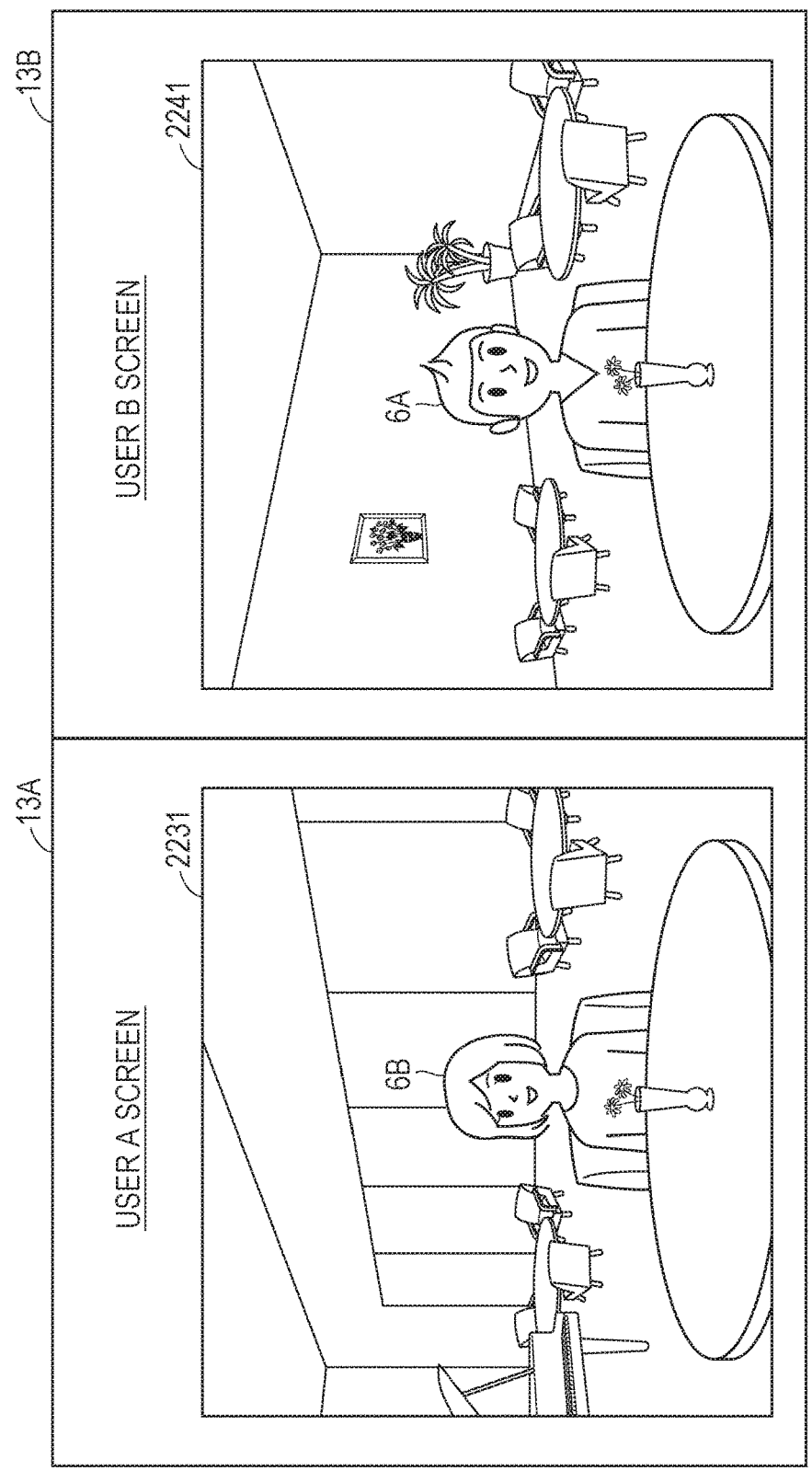

FIG. 19

| USER ID | USER INFORMATION | VIEWING SETTING INFORMATION | VIEWED SETTING INFORMATION | VIEWED HISTORY | PERSONAL SETTING INFORMATION |
|---|---|---|---|---|---|
| 000001 | USER INFORMATION (000001) | VIEWING SETTING INFORMATION (000001) | VIEWED SETTING INFORMATION (000001) | VIEWED HISTORY (000001) | PERSONAL SETTING INFORMATION (000001) |
| 000002 | USER INFORMATION (000002) | VIEWING SETTING INFORMATION (000002) | VIEWED SETTING INFORMATION (000002) | VIEWED HISTORY (000002) | PERSONAL SETTING INFORMATION (000002) |
| .. | .. | .. | .. | .. | .. |

USER INFORMATION

| DISPLAY NAME | KUMA |
|---|---|
| GENDER | MALE |
| AGE | 25 |
| DESIRED GENDER TO BE INTRODUCED | FEMALE |
| DESIRED AGE TO BE INTRODUCED | 20-29 |
| IP ADDRESS | *.*.*.* |

FIG. 21

VIEWING SETTING INFORMATION

| DAILY VIEWING COUNT SETTING | 100 |
|---|---|
| VIEWED NOTIFICATION SETTING | ON |

FIG. 22

VIEWED SETTING INFORMATION

| PRIORITY ARRANGEMENT SETTING | RANK 1 |
|---|---|
| PRIORITY INTRODUCTION SETTING | RANK 2 |

FIG. 23

VIEWED HISTORY

| VIEWING TIME | VIEWER ID |
|---|---|
| 2016.9.1 22:02 | 000046 |
| 2016.9.1 22:06 | 002013 |
| ⋮ | ⋮ |

FIG. 24

PERSONAL SETTING INFORMATION

| AVATAR SETTING | IMAGE FILE 01 |
|---|---|
| SPACE SETTING | ROOM 02, TABLE 01, ... |

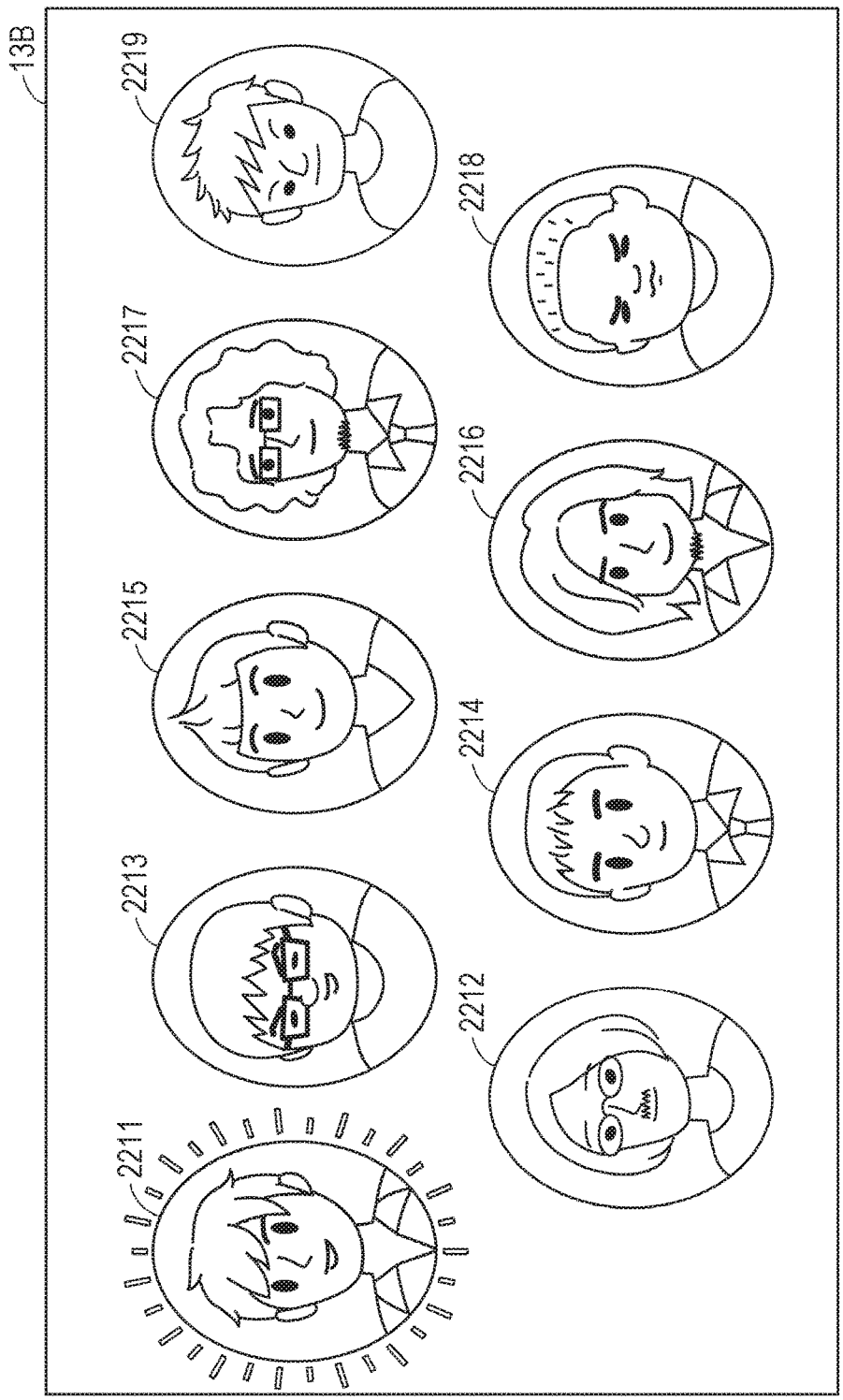

METHOD FOR PROVIDING VIRTUAL SPACE, AND SYSTEM FOR EXECUTING THE METHOD

RELATED APPLICATIONS

The present application claims priority to Japanese Patent Application No. 2016-253289 filed Dec. 27, 2016, the disclosure of which is hereby incorporated by reference herein in its entirety.

TECHNICAL FIELD

This disclosure relates to a technology for providing a virtual reality, and more particularly, to a technology for matching a plurality of objects from among many objects in a virtual reality.

BACKGROUND

Hitherto, there has been proposed various systems for matching users with each other on a network. Such proposals include, for example, "Coffee meets Bagel" described in Non-Patent Document 1 and "Happn" described in Non-Patent Document 2.

NON-PATENT DOCUMENTS

[Non-Patent Document 1] Author: Jordan Crook, Title: Dating App Coffee Meets Bagel Lands $7.8 Million In Series A, [online], Publication date: Jan. 18, 2015, Information source: https://techcrunch.com/2015/02/18/dating-app-coffee-meets-bagel-lands-7-8-million-in-series-a/, Japanese title: Well-Received High-Quality Dating App "Coffee Meets Bagel" Finally Reaches Series A (7.8 M) (original language: English)

[Non-Patent Document 2] Author: Romain Dillet, Title: Happn Attracts $14 Million For Its Dating App Powered By Real Life Interactions, [online], Publication Date: Sep. 30, 2015, Information source: https://techcrunch.com/2015/09/30/happn-attracts-14-million-fo r-its-dating-app-powered-by-real-life-interactions/, Japanese title: Positional Information Dating App "Happn" Raises 14 Million Dollars (original language: English)

SUMMARY

According to at least one embodiment of this disclosure, there is provided a method in which a computer provides a virtual space to a head-mounted device. The method includes detecting input from each of a plurality of users who are using a head-mounted device based on a motion by each of the users. The method further includes acquiring potential match users for each user from among the plurality of users. The method further includes displaying a virtual space including information representing the potential match users for each user on a display of the head-mounted device used by each of the plurality of users. The method further includes determining, based on the detected inputs, whether a period during which a first user among the plurality of users designates a second user among the plurality of users and a period during which the second user designates the first user satisfy a relation determined in advance. The method further includes establishing, in response to a determination that the relation is satisfied, a match between the first user and the second user.

BRIEF DESCRIPTION OF THE DRAWINGS

FIG. 9 A block diagram of a hardware configuration of a server according to at least one embodiment of this disclosure.

FIG. 11 A sequence chart of processing to be executed by a system including an HMD set according to at least one embodiment of this disclosure.

FIG. 18 A diagram of an example of the virtual space image representing an opened chat room according to at least one embodiment of this disclosure.

FIG. 19 A schematic table of an example of information content stored in a user information storage unit of the server according to at least one embodiment of this disclosure.

FIG. 20 A schematic table of an example of the "user information" content of FIG. 19 according to at least one embodiment of this disclosure.

FIG. 21 A schematic table of an example of the "viewing setting information" content of FIG. 19 according to at least one embodiment of this disclosure.

FIG. 22 A schematic table of an example of the "viewed setting information" content of FIG. 19 according to at least one embodiment of this disclosure.

FIG. 23 A schematic table of an example of the "viewed history" content of FIG. 19 according to at least one embodiment of this disclosure.

FIG. 24 A schematic table of an example of the "personal setting information" content of FIG. 19 according to at least one embodiment of this disclosure.

FIG. 35 A diagram of an example of the virtual space image according to at least one embodiment of this disclosure.

DETAILED DESCRIPTION

Now, with reference to the drawings, embodiments of this technical idea are described in detail. In the following description, like components are denoted by like reference symbols. The same applies to the names and functions of those components. Therefore, detailed description of those components is not repeated. In one or more embodiments described in this disclosure, components of respective embodiments can be combined with each other, and the combination also serves as a part of the embodiments described in this disclosure.

[Configuration of HMD System]

Figure 1:
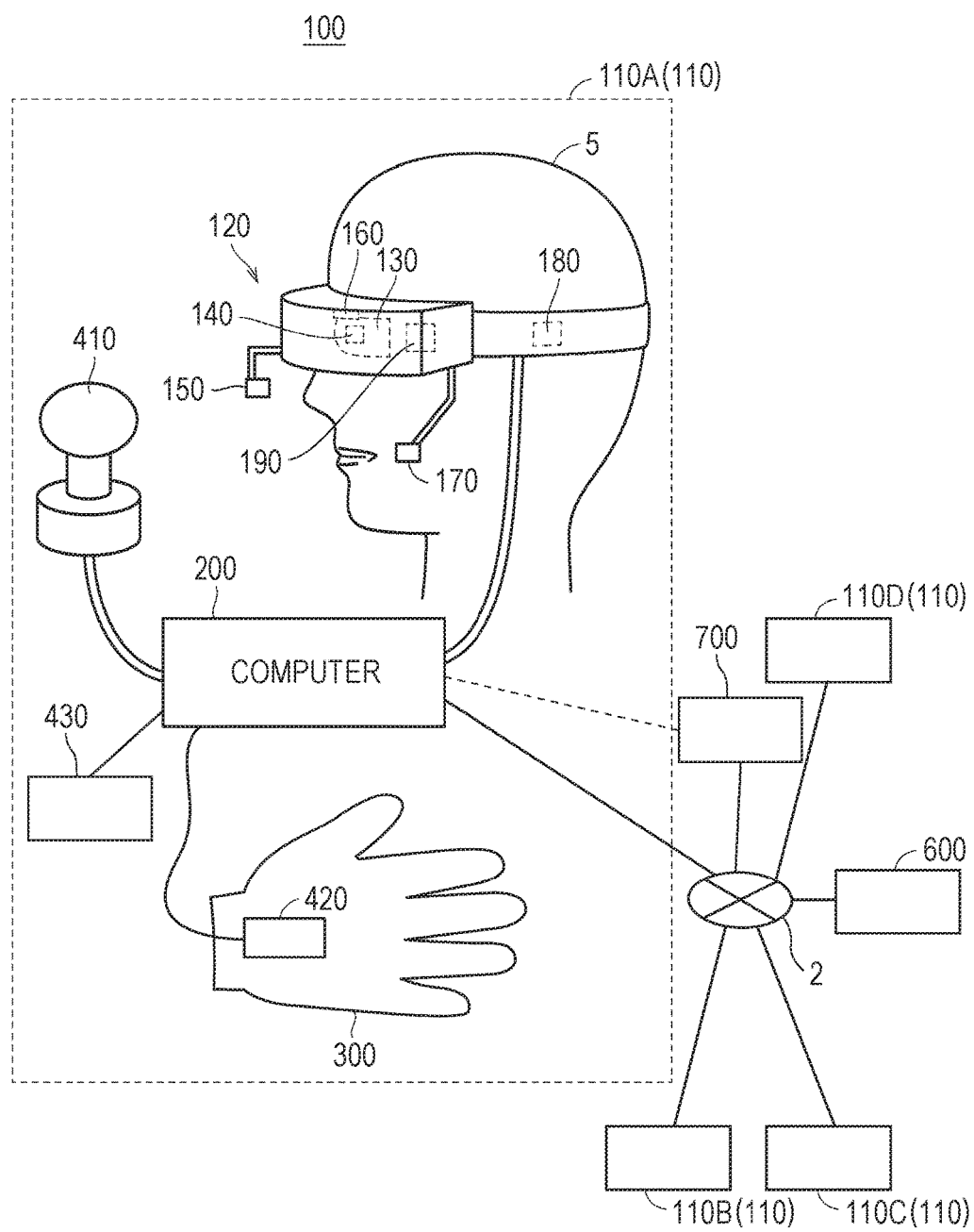
FIG. 1 A diagram of a system including a head-mounted device (HMD) according to at least one embodiment of this disclosure.

With reference to FIG. 1, a configuration of a head-mounted device (HMD) system 100 is described. FIG. 1 is a diagram of a system 100 including a head-mounted display (HMD) according to at least one embodiment of this disclosure. The system 100 is usable for household use or for professional use.

The system 100 includes a server 600, HMD sets 110A, 110B, 110C, and 110D, an external device 700, and a network 2. Each of the HMD sets 110A, 110B, 110C, and 110D is capable of independently communicating to/from the server 600 or the external device 700 via the network 2. In some instances, the HMD sets 110A, 110B, 110C, and 110D are also collectively referred to as "HMD set 110". The number of HMD sets 110 constructing the HMD system 100 is not limited to four, but may be three or less, or five or more. The HMD set 110 includes an HMD 120, a computer 200, an HMD sensor 410, a display 430, and a controller 300. The HMD 120 includes a monitor 130, an eye gaze sensor 140, a first camera 150, a second camera 160, a microphone 170, and a speaker 180. In at least one embodiment, the controller 300 includes a motion sensor 420.

In at least one aspect, the computer 200 is connected to the network 2, for example, the Internet, and is able to communicate to/from the server 600 or other computers connected to the network 2 in a wired or wireless manner. Examples of the other computers include a computer of another HMD set 110 or the external device 700. In at least one aspect, the HMD 120 includes a sensor 190 instead of the HMD sensor 410. In at least one aspect, the HMD 120 includes both sensor 190 and the HMD sensor 410.

The HMD 120 is wearable on a head of a user 5 to display a virtual space to the user 5 during operation. More specifically, in at least one embodiment, the HMD 120 displays each of a right-eye image and a left-eye image on the monitor 130. Each eye of the user 5 is able to visually recognize a corresponding image from the right-eye image and the left-eye image so that the user 5 may recognize a three-dimensional image based on the parallax of both of the user's the eyes. In at least one embodiment, the HMD 120 includes any one of a so-called head-mounted display including a monitor or a head-mounted device capable of mounting a smartphone or other terminals including a monitor.

The monitor 130 is implemented as, for example, a non-transmissive display device. In at least one aspect, the monitor 130 is arranged on a main body of the HMD 120 so as to be positioned in front of both the eyes of the user 5. Therefore, when the user 5 is able to visually recognize the three-dimensional image displayed by the monitor 130, the user 5 is immersed in the virtual space. In at least one aspect, the virtual space includes, for example, a background, objects that are operable by the user 5, or menu images that are selectable by the user 5. In at least one aspect, the monitor 130 is implemented as a liquid crystal monitor or an organic electroluminescence (EL) monitor included in a so-called smartphone or other information display terminals.

In at least one aspect, the monitor 130 is implemented as a transmissive display device. In this case, the user 5 is able to see through the HMD 120 covering the eyes of the user 5, for example, smartglasses. In at least one embodiment, the transmissive monitor 130 is configured as a temporarily non-transmissive display device through adjustment of a transmittance thereof. In at least one embodiment, the monitor 130 is configured to display a real space and a part of an image constructing the virtual space simultaneously. For example, in at least one embodiment, the monitor 130 displays an image of the real space captured by a camera mounted on the HMD 120, or may enable recognition of the real space by setting the transmittance of a part the monitor 130 sufficiently high to permit the user 5 to see through the HMD 120.

In at least one aspect, the monitor 130 includes a sub-monitor for displaying a right-eye image and a sub-monitor for displaying a left-eye image. In at least one aspect, the monitor 130 is configured to integrally display the right-eye image and the left-eye image. In this case, the monitor 130 includes a high-speed shutter. The high-speed shutter operates so as to alternately display the right-eye image to the right of the user 5 and the left-eye image to the left eye of the user 5, so that only one of the user's 5 eyes is able to recognize the image at any single point in time.

In at least one aspect, the HMD 120 includes a plurality of light sources (not shown). Each light source is implemented by, for example, a light emitting diode (LED) configured to emit an infrared ray. The HMD sensor 410 has a position tracking function for detecting the motion of the HMD 120. More specifically, the HMD sensor 410 reads a plurality of infrared rays emitted by the HMD 120 to detect the position and the inclination of the HMD 120 in the real space.

In at least one aspect, the HMD sensor 410 is implemented by a camera. In at least one aspect, the HMD sensor 410 uses image information of the HMD 120 output from the camera to execute image analysis processing, to thereby enable detection of the position and the inclination of the HMD 120.

In at least one aspect, the HMD 120 includes the sensor 190 instead of, or in addition to, the HMD sensor 410 as a position detector. In at least one aspect, the HMD 120 uses the sensor 190 to detect the position and the inclination of the HMD 120. For example, in at least one embodiment, when the sensor 190 is an angular velocity sensor, a geomagnetic sensor, or an acceleration sensor, the HMD 120 uses any or all of those sensors instead of (or in addition to) the HMD sensor 410 to detect the position and the inclination of the HMD 120. As an example, when the sensor 190 is an angular velocity sensor, the angular velocity sensor detects over time the angular velocity about each of three axes of the HMD 120 in the real space. The HMD 120 calculates a temporal change of the angle about each of the three axes of the HMD 120 based on each angular velocity, and further calculates an inclination of the HMD 120 based on the temporal change of the angles.

The eye gaze sensor 140 detects a direction in which the lines of sight of the right eye and the left eye of the user 5 are directed. That is, the eye gaze sensor 140 detects the line of sight of the user 5. The direction of the line of sight is detected by, for example, a known eye tracking function. The eye gaze sensor 140 is implemented by a sensor having the eye tracking function. In at least one aspect, the eye gaze sensor 140 includes a right-eye sensor and a left-eye sensor. In at least one embodiment, the eye gaze sensor 140 is, for example, a sensor configured to irradiate the right eye and the left eye of the user 5 with an infrared ray, and to receive reflection light from the cornea and the iris with respect to the irradiation light, to thereby detect a rotational angle of each of the user's 5 eyeballs. In at least one embodiment, the eye gaze sensor 140 detects the line of sight of the user 5 based on each detected rotational angle.

The first camera 150 photographs a lower part of a face of the user 5. More specifically, the first camera 150 photographs, for example, the nose or mouth of the user 5. The second camera 160 photographs, for example, the eyes and eyebrows of the user 5. A side of a casing of the HMD 120 on the user 5 side is defined as an interior side of the HMD 120, and a side of the casing of the HMD 120 on a side opposite to the user 5 side is defined as an exterior side of the HMD 120. In at least one aspect, the first camera 150 is arranged on an exterior side of the HMD 120, and the second camera 160 is arranged on an interior side of the HMD 120.

Images generated by the first camera 150 and the second camera 160 are input to the computer 200. In at least one aspect, the first camera 150 and the second camera 160 are implemented as a single camera, and the face of the user 5 is photographed with this single camera.

The microphone 170 converts an utterance of the user 5 into a voice signal (electric signal) for output to the computer 200. The speaker 180 converts the voice signal into a voice for output to the user 5. In at least one embodiment, the speaker 180 converts other signals into audio information provided to the user 5. In at least one aspect, the HMD 120 includes earphones in place of the speaker 180.

The controller 300 is connected to the computer 200 through wired or wireless communication. The controller 300 receives input of a command from the user 5 to the computer 200. In at least one aspect, the controller 300 is held by the user 5. In at least one aspect, the controller 300 is mountable to the body or a part of the clothes of the user 5. In at least one aspect, the controller 300 is configured to output at least any one of a vibration, a sound, or light based on the signal transmitted from the computer 200. In at least one aspect, the controller 300 receives from the user 5 an operation for controlling the position and the motion of an object arranged in the virtual space.

In at least one aspect, the controller 300 includes a plurality of light sources. Each light source is implemented by, for example, an LED configured to emit an infrared ray. The HMD sensor 410 has a position tracking function. In this case, the HMD sensor 410 reads a plurality of infrared rays emitted by the controller 300 to detect the position and the inclination of the controller 300 in the real space. In at least one aspect, the HMD sensor 410 is implemented by a camera. In this case, the HMD sensor 410 uses image information of the controller 300 output from the camera to execute image analysis processing, to thereby enable detection of the position and the inclination of the controller 300.

In at least one aspect, the motion sensor 420 is mountable on the hand of the user 5 to detect the motion of the hand of the user 5. For example, the motion sensor 420 detects a rotational speed, a rotation angle, and the number of rotations of the hand. The detected signal is transmitted to the computer 200. The motion sensor 420 is provided to, for example, the controller 300. In at least one aspect, the motion sensor 420 is provided to, for example, the controller 300 capable of being held by the user 5. In at least one aspect, to help prevent accidently release of the controller 300 in the real space, the controller 300 is mountable on an object like a glove-type object that does not easily fly away by being worn on a hand of the user 5. In at least one aspect, a sensor that is not mountable on the user 5 detects the motion of the hand of the user 5. For example, a signal of a camera that photographs the user 5 may be input to the computer 200 as a signal representing the motion of the user 5. As at least one example, the motion sensor 420 and the computer 200 are connected to each other through wired or wireless communication. In the case of wireless communication, the communication mode is not particularly limited, and for example, Bluetooth (trademark) or other known communication methods are usable.

The display 430 displays an image similar to an image displayed on the monitor 130. With this, a user other than the user 5 wearing the HMD 120 can also view an image similar to that of the user 5. An image to be displayed on the display 430 is not required to be a three-dimensional image, but may be a right-eye image or a left-eye image. For example, a liquid crystal display or an organic EL monitor may be used as the display 430.

In at least one embodiment, the server 600 transmits a program to the computer 200. In at least one aspect, the server 600 communicates to/from another computer 200 for providing virtual reality to the HMD 120 used by another user. For example, when a plurality of users play a participatory game, for example, in an amusement facility, each computer 200 communicates to/from another computer 200 via the server 600 with a signal that is based on the motion of each user, to thereby enable the plurality of users to enjoy a common game in the same virtual space. Each computer 200 may communicate to/from another computer 200 with the signal that is based on the motion of each user without intervention of the server 600.

The external device 700 is any suitable device as long as the external device 700 is capable of communicating to/from the computer 200. The external device 700 is, for example, a device capable of communicating to/from the computer 200 via the network 2, or is a device capable of directly communicating to/from the computer 200 by near field communication or wired communication. Peripheral devices such as a smart device, a personal computer (PC), or the computer 200 are usable as the external device 700, in at least one embodiment, but the external device 700 is not limited thereto.

[Hardware Configuration of Computer]

Figure 2:
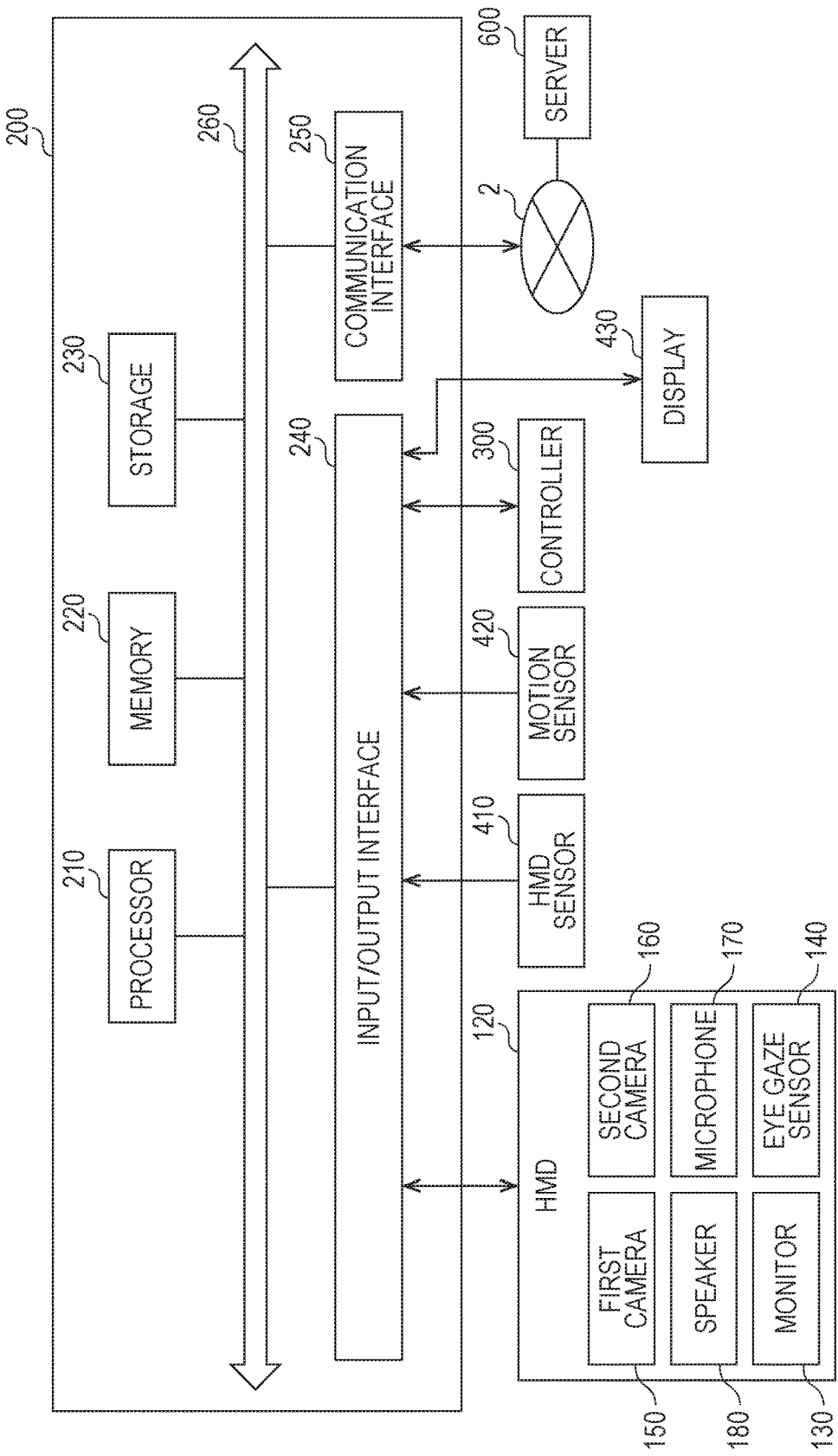
FIG. 2 A block diagram of a hardware configuration of a computer according to at least one embodiment of this disclosure.

With reference to FIG. 2, the computer 200 in at least one embodiment is described. FIG. 2 is a block diagram of a hardware configuration of the computer 200 according to at least one embodiment. The computer 200 includes, a processor 210, a memory 220, a storage 230, an input/output interface 240, and a communication interface 250. Each component is connected to a bus 260. In at least one embodiment, at least one of the processor 210, the memory 220, the storage 230, the input/output interface 240 or the communication interface 250 is part of a separate structure and communicates with other components of computer 200 through a communication path other than the bus 260.

The processor 210 executes a series of commands included in a program stored in the memory 220 or the storage 230 based on a signal transmitted to the computer 200 or in response to a condition determined in advance. In at least one aspect, the processor 210 is implemented as a central processing unit (CPU), a graphics processing unit (GPU), a micro-processor unit (MPU), a field-programmable gate array (FPGA), or other devices.

The memory 220 temporarily stores programs and data. The programs are loaded from, for example, the storage 230. The data includes data input to the computer 200 and data generated by the processor 210. In at least one aspect, the memory 220 is implemented as a random access memory (RAM) or other volatile memories.

The storage 230 permanently stores programs and data. In at least one embodiment, the storage 230 stores programs and data for a period of time longer than the memory 220, but not permanently. The storage 230 is implemented as, for example, a read-only memory (ROM), a hard disk device, a flash memory, or other non-volatile storage devices. The programs stored in the storage 230 include programs for providing a virtual space in the system 100, simulation programs, game programs, user authentication programs, and programs for implementing communication to/from other computers 200. The data stored in the storage 230 includes data and objects for defining the virtual space.

In at least one aspect, the storage 230 is implemented as a removable storage device like a memory card. In at least one aspect, a configuration that uses programs and data stored in an external storage device is used instead of the storage 230 built into the computer 200. With such a configuration, for example, in a situation in which a plurality of HMD systems 100 are used, for example in an amusement facility, the programs and the data are collectively updated.

The input/output interface 240 allows communication of signals among the HMD 120, the HMD sensor 410, the motion sensor 420, and the display 430. The monitor 130, the eye gaze sensor 140, the first camera 150, the second camera 160, the microphone 170, and the speaker 180 included in the HMD 120 may communicate to/from the computer 200 via the input/output interface 240 of the HMD 120. In at least one aspect, the input/output interface 240 is implemented with use of a universal serial bus (USB), a digital visual interface (DVI), a high-definition multimedia interface (HDMI) (trademark), or other terminals. The input/output interface 240 is not limited to the specific examples described above.

In at least one aspect, the input/output interface 240 further communicates to/from the controller 300. For example, the input/output interface 240 receives input of a signal output from the controller 300 and the motion sensor 420. In at least one aspect, the input/output interface 240 transmits a command output from the processor 210 to the controller 300. The command instructs the controller 300 to, for example, vibrate, output a sound, or emit light. When the controller 300 receives the command, the controller 300 executes anyone of vibration, sound output, and light emission in accordance with the command.

The communication interface 250 is connected to the network 2 to communicate to/from other computers (e.g., server 600) connected to the network 2. In at least one aspect, the communication interface 250 is implemented as, for example, a local area network (LAN), other wired communication interfaces, wireless fidelity (Wi-Fi), Bluetooth (R), near field communication (NFC), or other wireless communication interfaces. The communication interface 250 is not limited to the specific examples described above.

In at least one aspect, the processor 210 accesses the storage 230 and loads one or more programs stored in the storage 230 to the memory 220 to execute a series of commands included in the program. In at least one embodiment, the one or more programs includes an operating system of the computer 200, an application program for providing a virtual space, and/or game software that is executable in the virtual space. The processor 210 transmits a signal for providing a virtual space to the HMD 120 via the input/output interface 240. The HMD 120 displays a video on the monitor 130 based on the signal.

In FIG. 2, the computer 200 is outside of the HMD 120, but in at least one aspect, the computer 200 is integral with the HMD 120. As an example, a portable information communication terminal (e.g., smartphone) including the monitor 130 functions as the computer 200 in at least one embodiment.

In at least one embodiment, the computer 200 is used in common with a plurality of HMDs 120. With such a configuration, for example, the computer 200 is able to provide the same virtual space to a plurality of users, and hence each user can enjoy the same application with other users in the same virtual space.

According to at least one embodiment of this disclosure, in the system 100, a real coordinate system is set in advance. The real coordinate system is a coordinate system in the real space. The real coordinate system has three reference directions (axes) that are respectively parallel to a vertical direction, a horizontal direction orthogonal to the vertical direction, and a front-rear direction orthogonal to both of the vertical direction and the horizontal direction in the real space. The horizontal direction, the vertical direction (up-down direction), and the front-rear direction in the real coordinate system are defined as an x axis, a y axis, and a z axis, respectively. More specifically, the x axis of the real coordinate system is parallel to the horizontal direction of the real space, the y axis thereof is parallel to the vertical direction of the real space, and the z axis thereof is parallel to the front-rear direction of the real space.

In at least one aspect, the HMD sensor 410 includes an infrared sensor. When the infrared sensor detects the infrared ray emitted from each light source of the HMD 120, the infrared sensor detects the presence of the HMD 120. The HMD sensor 410 further detects the position and the inclination (direction) of the HMD 120 in the real space, which corresponds to the motion of the user 5 wearing the HMD 120, based on the value of each point (each coordinate value in the real coordinate system). In more detail, the HMD sensor 410 is able to detect the temporal change of the position and the inclination of the HMD 120 with use of each value detected over time.

Each inclination of the HMD 120 detected by the HMD sensor 410 corresponds to an inclination about each of the three axes of the HMD 120 in the real coordinate system. The HMD sensor 410 sets a uvw visual-field coordinate system to the HMD 120 based on the inclination of the HMD 120 in the real coordinate system. The uvw visual-field coordinate system set to the HMD 120 corresponds to a point-of-view coordinate system used when the user 5 wearing the HMD 120 views an object in the virtual space.

[Uvw Visual-field Coordinate System]

Figure 3:
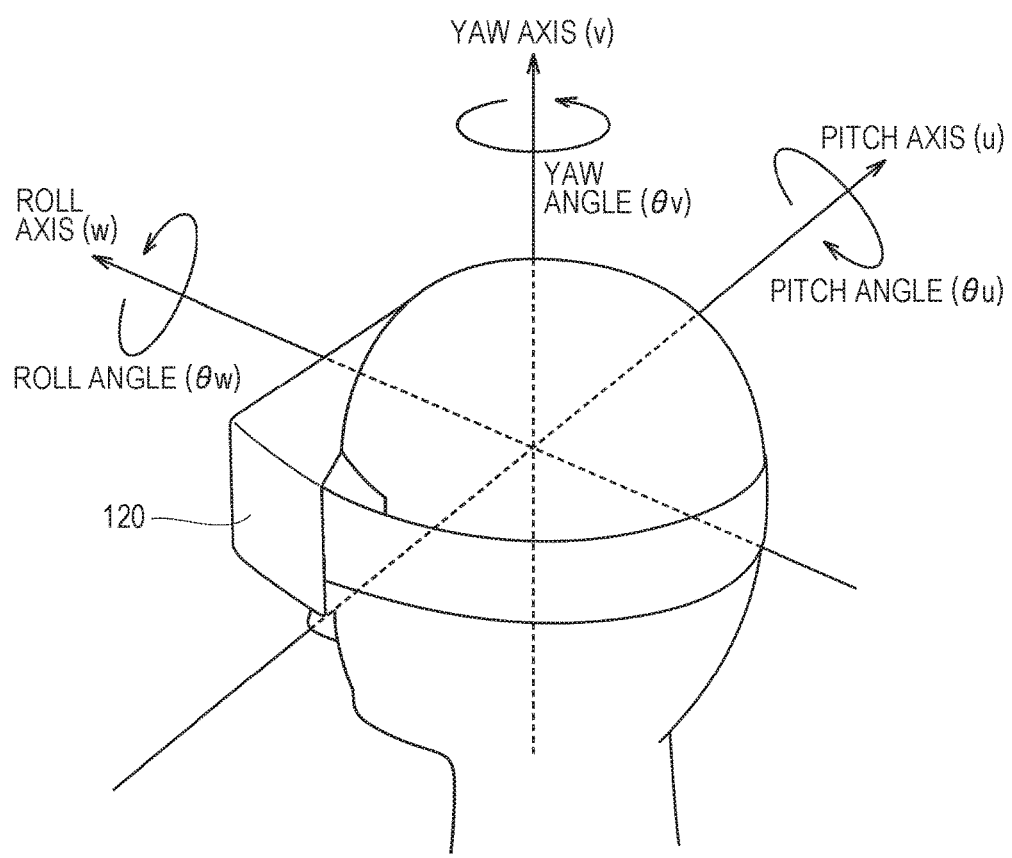
FIG. 3 A diagram of a uvw visual-field coordinate system to be set for an HMD according to at least one embodiment of this disclosure.

With reference to FIG. 3, the uvw visual-field coordinate system is described. FIG. 3 is a diagram of a uvw visual-field coordinate system to be set for the HMD 120 according to at least one embodiment of this disclosure. The HMD sensor 410 detects the position and the inclination of the HMD 120 in the real coordinate system when the HMD 120 is activated. The processor 210 sets the uvw visual-field coordinate system to the HMD 120 based on the detected values.

In FIG. 3, the HMD 120 sets the three-dimensional uvw visual-field coordinate system defining the head of the user 5 wearing the HMD 120 as a center (origin). More specifically, the HMD 120 sets three directions newly obtained by inclining the horizontal direction, the vertical direction, and the front-rear direction (x axis, y axis, and z axis), which define the real coordinate system, about the respective axes by the inclinations about the respective axes of the HMD 120 in the real coordinate system, as a pitch axis (u axis), a yaw axis (v axis), and a roll axis (w axis) of the uvw visual-field coordinate system in the HMD 120.

In at least one aspect, when the user 5 wearing the HMD 120 is standing (or sitting) upright and is visually recognizing the front side, the processor 210 sets the uvw visual-field coordinate system that is parallel to the real coordinate system to the HMD 120. In this case, the horizontal direction (x axis), the vertical direction (y axis), and the front-rear direction (z axis) of the real coordinate system directly match the pitch axis (u axis), the yaw axis (v axis), and the roll axis (w axis) of the uvw visual-field coordinate system in the HMD 120, respectively.

After the uvw visual-field coordinate system is set to the HMD 120, the HMD sensor 410 is able to detect the inclination of the HMD 120 in the set uvw visual-field coordinate system based on the motion of the HMD 120. In this case, the HMD sensor 410 detects, as the inclination of the HMD 120, each of a pitch angle (θu), a yaw angle (θv), and a roll angle (θw) of the HMD 120 in the uvw visual-field coordinate system. The pitch angle (θu) represents an inclination angle of the HMD 120 about the pitch axis in the uvw visual-field coordinate system. The yaw angle (θv) represents an inclination angle of the HMD 120 about the yaw axis in the uvw visual-field coordinate system. The roll angle (θw) represents an inclination angle of the HMD 120 about the roll axis in the uvw visual-field coordinate system.

The HMD sensor 410 sets, to the HMD 120, the uvw visual-field coordinate system of the HMD 120 obtained after the movement of the HMD 120 based on the detected inclination angle of the HMD 120. The relationship between the HMD 120 and the uvw visual-field coordinate system of the HMD 120 is constant regardless of the position and the inclination of the HMD 120. When the position and the inclination of the HMD 120 change, the position and the inclination of the uvw visual-field coordinate system of the HMD 120 in the real coordinate system change in synchronization with the change of the position and the inclination.

In at least one aspect, the HMD sensor 410 identifies the position of the HMD 120 in the real space as a position relative to the HMD sensor 410 based on the light intensity of the infrared ray or a relative positional relationship between a plurality of points (e.g., distance between points), which is acquired based on output from the infrared sensor. In at least one aspect, the processor 210 determines the origin of the uvw visual-field coordinate system of the HMD 120 in the real space (real coordinate system) based on the identified relative position.

[Virtual Space]

Figure 4:
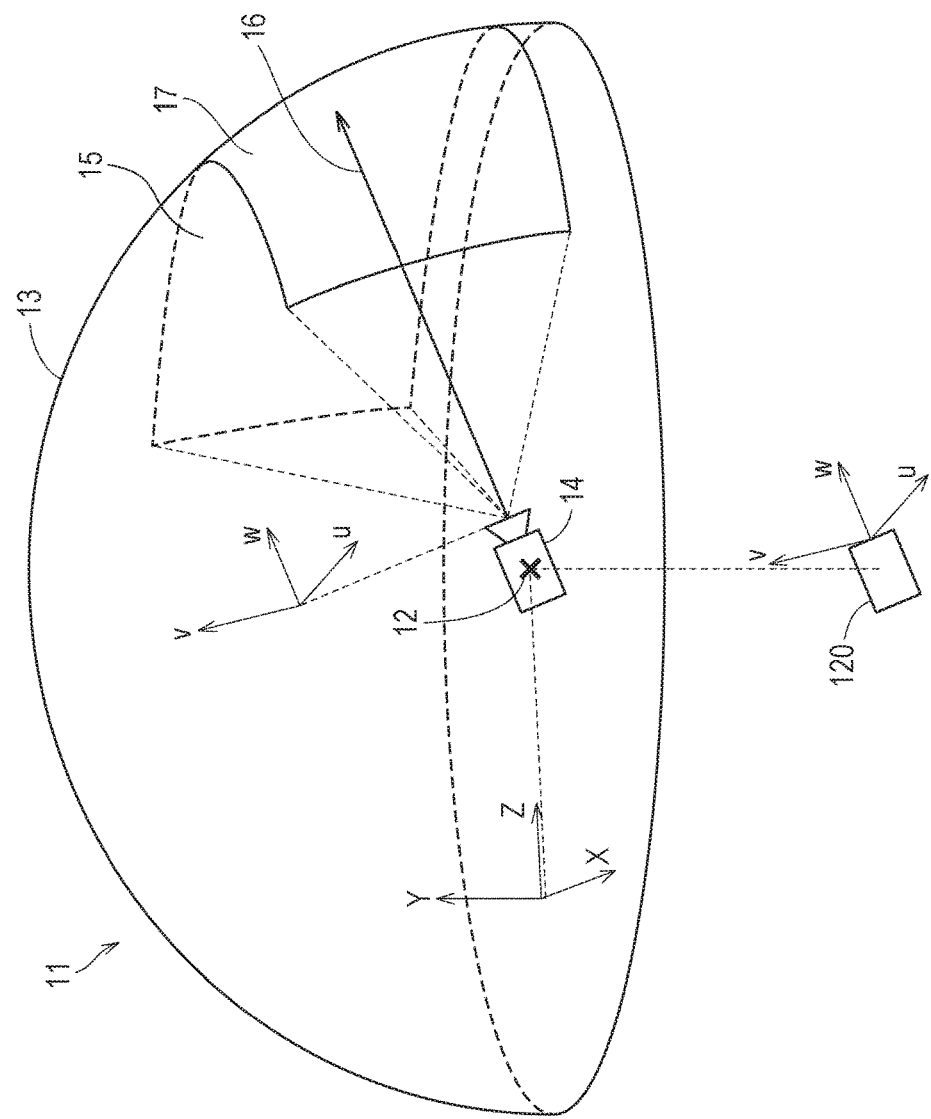
FIG. 4 A diagram of a mode of expressing a virtual space according to at least one embodiment of this disclosure.

With reference to FIG. 4, the virtual space is further described. FIG. 4 is a diagram of a mode of expressing a virtual space 11 according to at least one embodiment of this disclosure. The virtual space 11 has a structure with an entire celestial sphere shape covering a center 12 in all 360-degree directions. In FIG. 4, for the sake of clarity, only the upper-half celestial sphere of the virtual space 11 is included. Each mesh section is defined in the virtual space 11. The position of each mesh section is defined in advance as coordinate values in an XYZ coordinate system, which is a global coordinate system defined in the virtual space 11. The computer 200 associates each partial image forming a panorama image 13 (e.g., still image or moving image) that is developed in the virtual space 11 with each corresponding mesh section in the virtual space 11.

In at least one aspect, in the virtual space 11, the XYZ coordinate system having the center 12 as the origin is defined. The XYZ coordinate system is, for example, parallel to the real coordinate system. The horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the real coordinate system, the Y axis (vertical direction) of the XYZ coordinate system is parallel to the y axis of the real coordinate system, and the Z axis (front-rear direction) of the XYZ coordinate system is parallel to the z axis of the real coordinate system.

When the HMD 120 is activated, that is, when the HMD 120 is in an initial state, a virtual camera 14 is arranged at the center 12 of the virtual space 11. In at least one embodiment, the virtual camera 14 is offset from the center 12 in the initial state. In at least one aspect, the processor 210 displays on the monitor 130 of the HMD 120 an image photographed by the virtual camera 14. In synchronization with the motion of the HMD 120 in the real space, the virtual camera 14 similarly moves in the virtual space 11. With this, the change in position and direction of the HMD 120 in the real space is reproduced similarly in the virtual space 11.

The uvw visual-field coordinate system is defined in the virtual camera 14 similarly to the case of the HMD 120. The uvw visual-field coordinate system of the virtual camera 14 in the virtual space 11 is defined to be synchronized with the uvw visual-field coordinate system of the HMD 120 in the real space (real coordinate system). Therefore, when the inclination of the HMD 120 changes, the inclination of the virtual camera 14 also changes in synchronization therewith. The virtual camera 14 can also move in the virtual space 11 in synchronization with the movement of the user 5 wearing the HMD 120 in the real space.

The processor 210 of the computer 200 defines a field-of-view region 15 in the virtual space 11 based on the position and inclination (reference line of sight 16) of the virtual camera 14. The field-of-view region 15 corresponds to, of the virtual space 11, the region that is visually recognized by the user 5 wearing the HMD 120. That is, the position of the virtual camera 14 determines a point of view of the user 5 in the virtual space 11.

The line of sight of the user 5 detected by the eye gaze sensor 140 is a direction in the point-of-view coordinate system obtained when the user 5 visually recognizes an object. The uvw visual-field coordinate system of the HMD 120 is equal to the point-of-view coordinate system used when the user 5 visually recognizes the monitor 130. The uvw visual-field coordinate system of the virtual camera 14 is synchronized with the uvw visual-field coordinate system of the HMD 120. Therefore, in the system 100 in at least one aspect, the line of sight of the user 5 detected by the eye gaze sensor 140 can be regarded as the line of sight of the user 5 in the uvw visual-field coordinate system of the virtual camera 14.

[User's Line of Sight]

Figure 5:
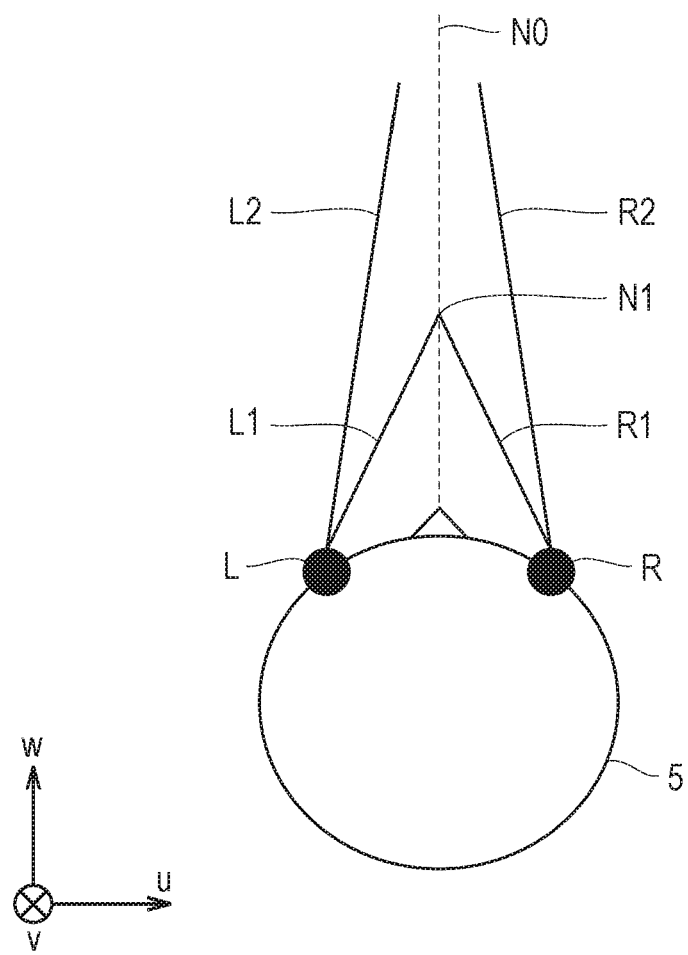
FIG. 5 A diagram of a plan view of a head of a user wearing the HMD according to at least one embodiment of this disclosure.

With reference to FIG. 5, determination of the line of sight of the user 5 is described. FIG. 5 is a plan view diagram of the head of the user 5 wearing the HMD 120 according to at least one embodiment of this disclosure.

In at least one aspect, the eye gaze sensor 140 detects lines of sight of the right eye and the left eye of the user 5. In at least one aspect, when the user 5 is looking at a near place, the eye gaze sensor 140 detects lines of sight R1 and L1. In at least one aspect, when the user 5 is looking at a far place, the eye gaze sensor 140 detects lines of sight R2 and L2. In this case, the angles formed by the lines of sight R2 and L2 with respect to the roll axis w are smaller than the angles formed by the lines of sight R1 and L1 with respect to the roll axis w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line of sight N0 of the user 5 based on the identified point of gaze N1. The computer 200 detects, for example, an extension direction of a straight line that passes through the point of gaze N1 and a midpoint of a straight line connecting a right eye R and a left eye L of the user 5 to each other as the line of sight N0. The line of sight N0 is a direction in which the user 5 actually directs his or her lines of sight with both eyes. The line of sight N0 corresponds to a direction in which the user 5 actually directs his or her lines of sight with respect to the field-of-view region 15.

In at least one aspect, the system 100 includes a television broadcast reception tuner. With such a configuration, the system 100 is able to display a television program in the virtual space 11.

In at least one aspect, the HMD system 100 includes a communication circuit for connecting to the Internet or has a verbal communication function for connecting to a telephone line or a cellular service.

[Field-of-view Region]

Figure 6:
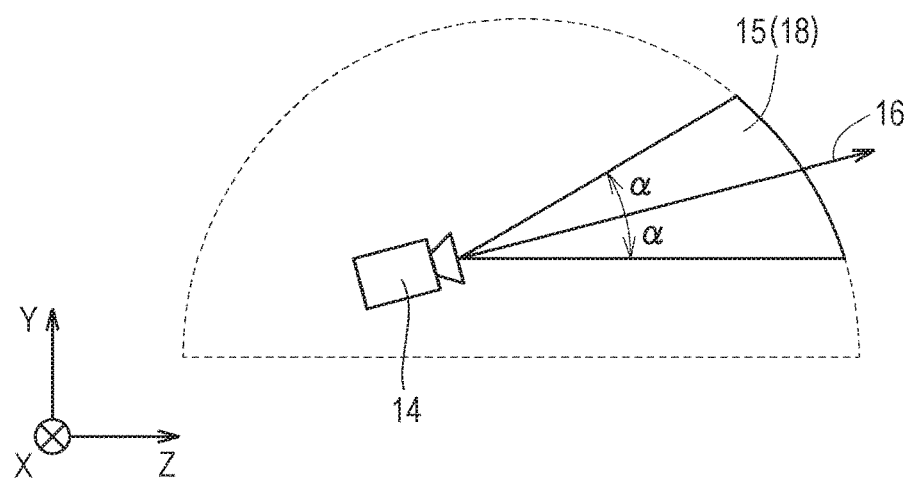
FIG. 6 A diagram of a YZ cross section obtained by viewing a field-of-view region from an X direction in the virtual space according to at least one embodiment of this disclosure.
Figure 7:
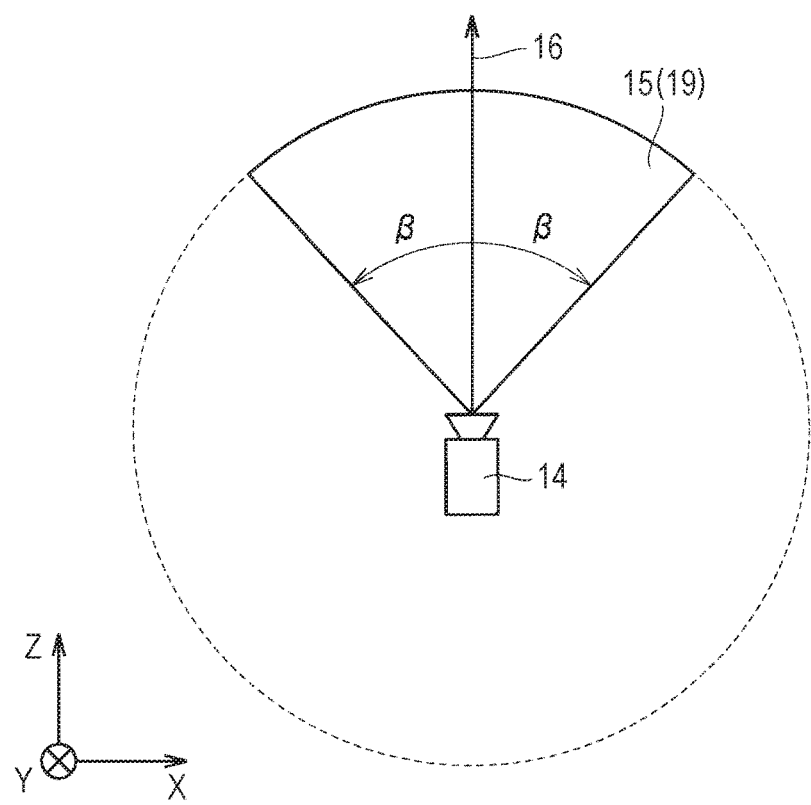
FIG. 7 A diagram of an XZ cross section obtained by viewing the field-of-view region from a Y direction in the virtual space according to at least one embodiment of this disclosure.

With reference to FIG. 6 and FIG. 7, the field-of-view region 15 is described. FIG. 6 is a diagram of a YZ cross section obtained by viewing the field-of-view region 15 from an X direction in the virtual space 11. FIG. 7 is a diagram of an XZ cross section obtained by viewing the field-of-view region 15 from a Y direction in the virtual space 11.

In FIG. 6, the field-of-view region 15 in the YZ cross section includes a region 18. The region 18 is defined by the position of the virtual camera 14, the reference line of sight 16, and the YZ cross section of the virtual space 11. The processor 210 defines a range of a polar angle α from the reference line of sight 16 serving as the center in the virtual space as the region 18.

In FIG. 7, the field-of-view region 15 in the XZ cross section includes a region 19. The region 19 is defined by the position of the virtual camera 14, the reference line of sight 16, and the XZ cross section of the virtual space 11. The processor 210 defines a range of an azimuth β from the reference line of sight 16 serving as the center in the virtual space 11 as the region 19. The polar angle α and β are determined in accordance with the position of the virtual camera 14 and the inclination (direction) of the virtual camera 14.

In at least one aspect, the system 100 causes the monitor 130 to display a field-of-view image 17 based on the signal from the computer 200, to thereby provide the field of view in the virtual space 11 to the user 5. The field-of-view image 17 corresponds to a part of the panorama image 13, which corresponds to the field-of-view region 15. When the user 5 moves the HMD 120 worn on his or her head, the virtual camera 14 is also moved in synchronization with the movement. As a result, the position of the field-of-view region 15 in the virtual space 11 is changed. With this, the field-of-view image 17 displayed on the monitor 130 is updated to an image of the panorama image 13, which is superimposed on the field-of-view region 15 synchronized with a direction in which the user 5 faces in the virtual space 11. The user 5 can visually recognize a desired direction in the virtual space 11.

In this way, the inclination of the virtual camera 14 corresponds to the line of sight of the user 5 (reference line of sight 16) in the virtual space 11, and the position at which the virtual camera 14 is arranged corresponds to the point of view of the user 5 in the virtual space 11. Therefore, through the change of the position or inclination of the virtual camera 14, the image to be displayed on the monitor 130 is updated, and the field of view of the user 5 is moved.

While the user 5 is wearing the HMD 120 (having a non-transmissive monitor 130), the user 5 can visually recognize only the panorama image 13 developed in the virtual space 11 without visually recognizing the real world. Therefore, the system 100 provides a high sense of immersion in the virtual space 11 to the user 5.

In at least one aspect, the processor 210 moves the virtual camera 14 in the virtual space 11 in synchronization with the movement in the real space of the user 5 wearing the HMD 120. In this case, the processor 210 identifies an image region to be projected on the monitor 130 of the HMD 120 (field-of-view region 15) based on the position and the direction of the virtual camera 14 in the virtual space 11.

In at least one aspect, the virtual camera 14 includes two virtual cameras, that is, a virtual camera for providing a right-eye image and a virtual camera for providing a left-eye image. An appropriate parallax is set for the two virtual cameras so that the user 5 is able to recognize the three-dimensional virtual space 11. In at least one aspect, the virtual camera 14 is implemented by a single virtual camera. In this case, a right-eye image and a left-eye image may be generated from an image acquired by the single virtual camera. In at least one embodiment, the virtual camera 14 is assumed to include two virtual cameras, and the roll axes of the two virtual cameras are synthesized so that the generated roll axis (w) is adapted to the roll axis (w) of the HMD 120.

[Controller]

Figure 8A:
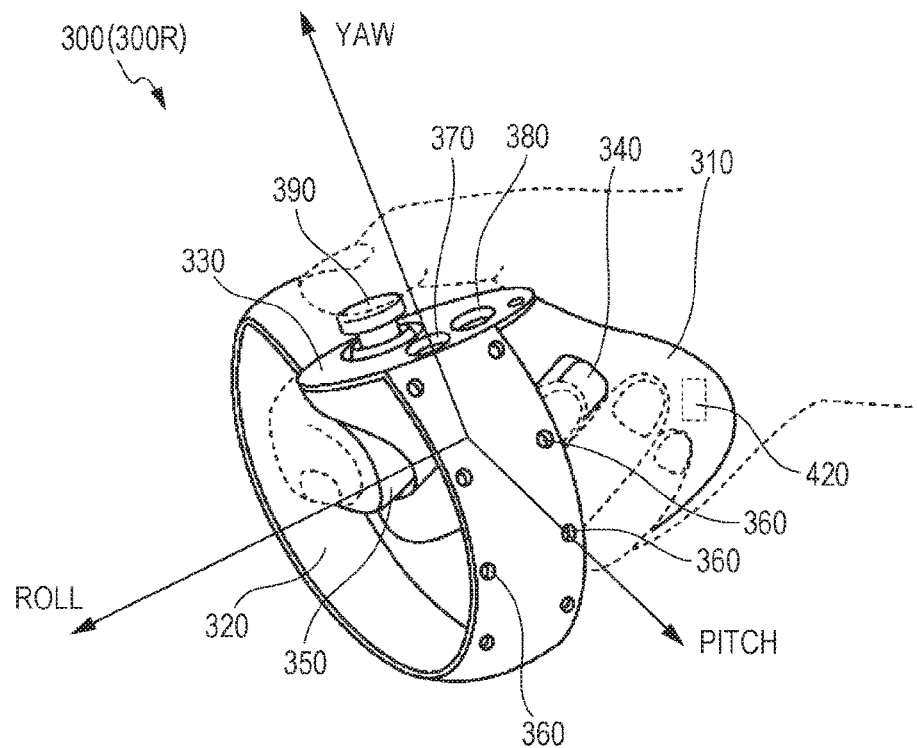
FIG. 8A A diagram of a schematic configuration of a controller according to at least one embodiment of this disclosure.
Figure 8B:
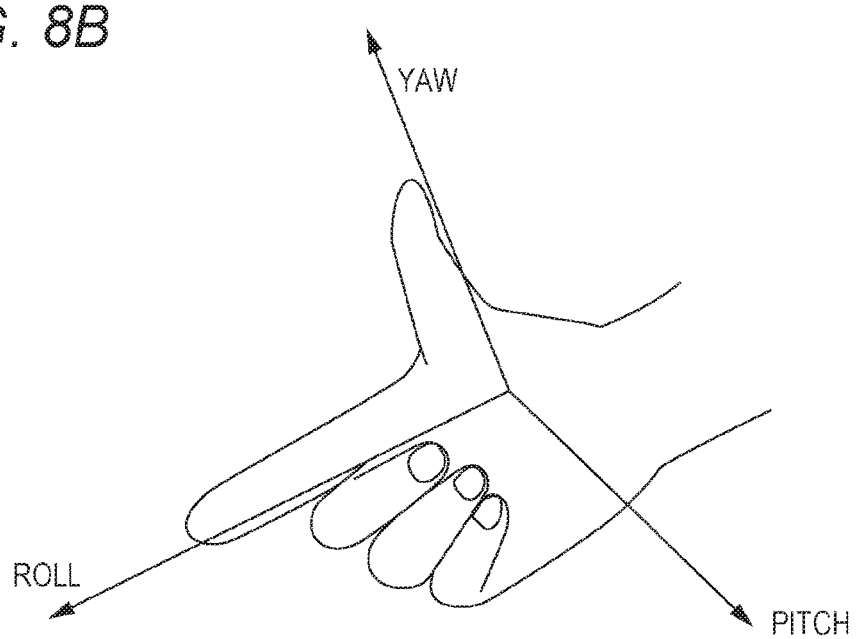
FIG. 8B A diagram of an example of a yaw direction, a roll direction, and a pitch direction that are defined with respect to a right hand of the user according to at least one embodiment of this disclosure.

An example of the controller 300 is described with reference to FIG. 8A and FIG. 8B. FIG. 8A is a diagram of a schematic configuration of a controller according to at least one embodiment of this disclosure. FIG. 8B is a diagram of a coordinate system to be set for a hand of a user holding the controller according to at least one embodiment of this disclosure.

In at least one aspect, the controller 300 includes a right controller 300R and a left controller (not shown). In FIG. 8A only right controller 300R is shown for the sake of clarity. The right controller 300R is operable by the right hand of the user 5. The left controller is operable by the left hand of the user 5. In at least one aspect, the right controller 300R and the left controller are symmetrically configured as separate devices. Therefore, the user 5 can freely move his or her right hand holding the right controller 300R and his or her left hand holding the left controller. In at least one aspect, the controller 300 may be an integrated controller configured to receive an operation performed by both the right and left hands of the user 5. The right controller 300R is now described.

The right controller 300R includes a grip 310, a frame 320, and a top surface 330. The grip 310 is configured so as to be held by the right hand of the user 5. For example, the grip 310 may be held by the palm and three fingers (e.g., middle finger, ring finger, and small finger) of the right hand of the user 5.

The grip 310 includes buttons 340 and 350 and the motion sensor 420. The button 340 is arranged on a side surface of the grip 310, and receives an operation performed by, for example, the middle finger of the right hand. The button 350 is arranged on a front surface of the grip 310, and receives an operation performed by, for example, the index finger of the right hand. In at least one aspect, the buttons 340 and 350 are configured as trigger type buttons. The motion sensor 420 is built into the casing of the grip 310. When a motion of the user 5 can be detected from the surroundings of the user 5 by a camera or other device. In at least one embodiment, the grip 310 does not include the motion sensor 420.

The frame 320 includes a plurality of infrared LEDs 360 arranged in a circumferential direction of the frame 320. The infrared LEDs 360 emit, during execution of a program using the controller 300, infrared rays in accordance with progress of the program. The infrared rays emitted from the infrared LEDs 360 are usable to independently detect the position and the posture (inclination and direction) of each of the right controller 300R and the left controller. In FIG. 8A, the infrared LEDs 360 are shown as being arranged in two rows, but the number of arrangement rows is not limited to that illustrated in FIG. 8. In at least one embodiment, the infrared LEDs 360 are arranged in one row or in three or more rows. In at least one embodiment, the infrared LEDs 360 are arranged in a pattern other than rows.

The top surface 330 includes buttons 370 and 380 and an analog stick 390. The buttons 370 and 380 are configured as push type buttons. The buttons 370 and 380 receive an operation performed by the thumb of the right hand of the user 5. In at least one aspect, the analog stick 390 receives an operation performed in any direction of 360 degrees from an initial position (neutral position). The operation includes, for example, an operation for moving an object arranged in the virtual space 11.

In at least one aspect, each of the right controller 300R and the left controller includes a battery for driving the infrared ray LEDs 360 and other members. The battery includes, for example, a rechargeable battery, a button battery, a dry battery, but the battery is not limited thereto. In at least one aspect, the right controller 300R and the left controller are connectable to, for example, a USB interface of the computer 200. In at least one embodiment, the right controller 300R and the left controller do not include a battery.

In FIG. 8A and FIG. 8B, for example, a yaw direction, a roll direction, and a pitch direction are defined with respect to the right hand of the user 5. A direction of an extended thumb is defined as the yaw direction, a direction of an extended index finger is defined as the roll direction, and a direction perpendicular to a plane defined by the yaw-direction axis and the roll-direction axis when the user 5 extends his or her thumb and index finger is defined as the pitch direction.

[Hardware Configuration of Server]

With reference to FIG. 9, the server 600 in at least one embodiment is described. FIG. 9 is a block diagram of a hardware configuration of the server 600 according to at least one embodiment of this disclosure. The server 600 includes a processor 610, a memory 620, a storage 630, an input/output interface 640, and a communication interface 650. Each component is connected to a bus 660. In at least one embodiment, at least one of the processor 610, the memory 620, the storage 630, the input/output interface 640 or the communication interface 650 is part of a separate structure and communicates with other components of server 600 through a communication path other than the bus 660.

The processor 610 executes a series of commands included in a program stored in the memory 620 or the storage 630 based on a signal transmitted to the server 600 or on satisfaction of a condition determined in advance. In at least one aspect, the processor 610 is implemented as a central processing unit (CPU), a graphics processing unit (GPU), a micro processing unit (MPU), a field-programmable gate array (FPGA), or other devices.

The memory 620 temporarily stores programs and data. The programs are loaded from, for example, the storage 630. The data includes data input to the server 600 and data generated by the processor 610. In at least one aspect, the memory 620 is implemented as a random access memory (RAM) or other volatile memories.

The storage 630 permanently stores programs and data. In at least one embodiment, the storage 630 stores programs and data for a period of time longer than the memory 620, but not permanently. The storage 630 is implemented as, for example, a read-only memory (ROM), a hard disk device, a flash memory, or other non-volatile storage devices. The programs stored in the storage 630 include programs for providing a virtual space in the system 100, simulation programs, game programs, user authentication programs, and programs for implementing communication to/from other computers 200 or servers 600. The data stored in the storage 630 may include, for example, data and objects for defining the virtual space.

In at least one aspect, the storage 630 is implemented as a removable storage device like a memory card. In at least one aspect, a configuration that uses programs and data stored in an external storage device is used instead of the storage 630 built into the server 600. With such a configuration, for example, in a situation in which a plurality of HMD systems 100 are used, for example, as in an amusement facility, the programs and the data are collectively updated.

The input/output interface 640 allows communication of signals to/from an input/output device. In at least one aspect, the input/output interface 640 is implemented with use of a USB, a DVI, an HDMI, or other terminals. The input/output interface 640 is not limited to the specific examples described above.

The communication interface 650 is connected to the network 2 to communicate to/from the computer 200 connected to the network 2. In at least one aspect, the communication interface 650 is implemented as, for example, a LAN, other wired communication interfaces, Wi-Fi, Bluetooth, NFC, or other wireless communication interfaces. The communication interface 650 is not limited to the specific examples described above.

In at least one aspect, the processor 610 accesses the storage 630 and loads one or more programs stored in the storage 630 to the memory 620 to execute a series of commands included in the program. In at least one embodiment, the one or more programs include, for example, an operating system of the server 600, an application program for providing a virtual space, and game software that can be executed in the virtual space. In at least one embodiment, the processor 610 transmits a signal for providing a virtual space to the HMD device 110 to the computer 200 via the input/output interface 640.

[Control Device of HMD]

Figure 10:
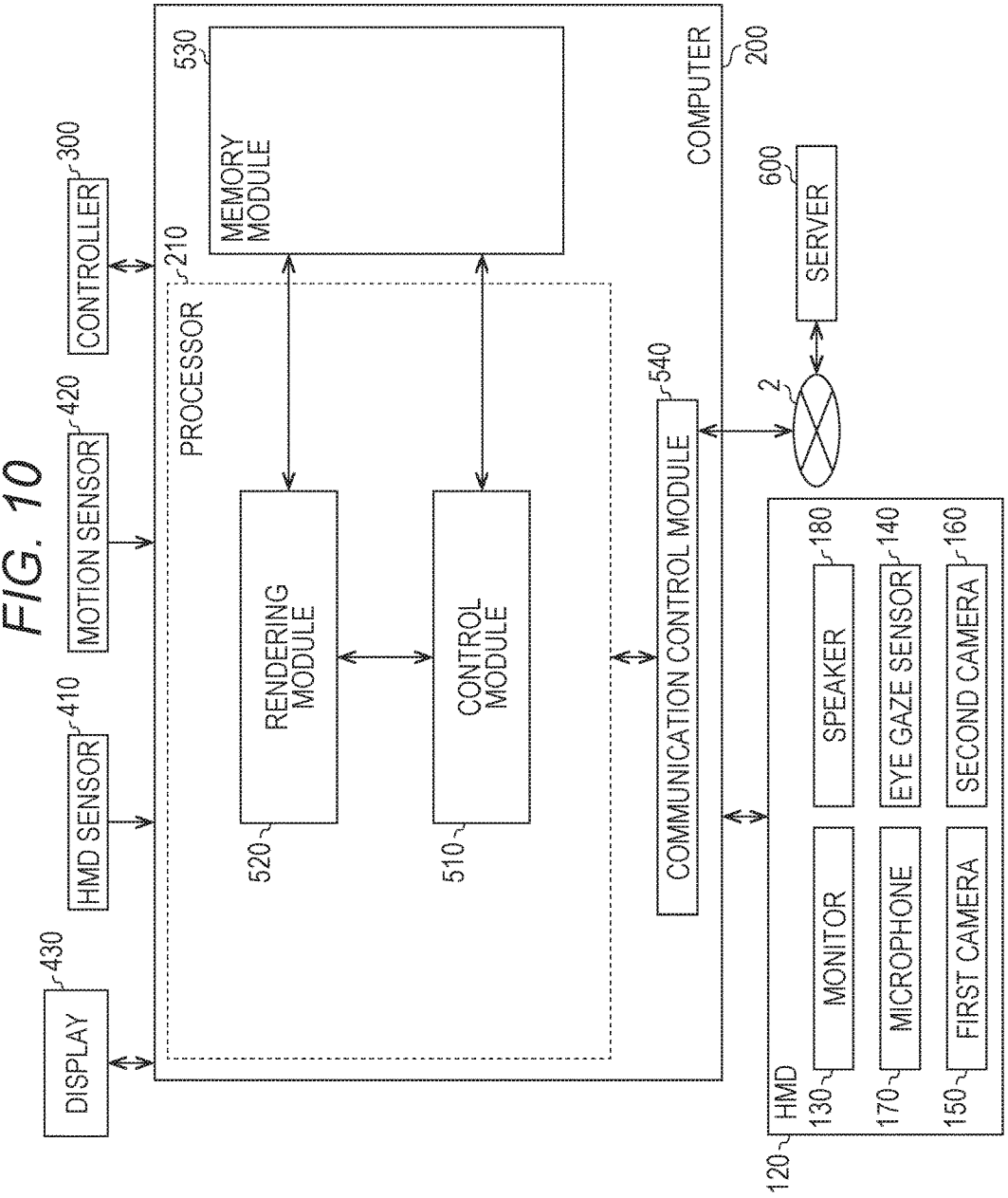
FIG. 10 A block diagram of a computer according to at least one embodiment of this disclosure.

With reference to FIG. 10, the control device of the HMD 120 is described. According to at least one embodiment of this disclosure, the control device is implemented by the computer 200 having a known configuration. FIG. 10 is a block diagram of the computer 200 according to at least one embodiment of this disclosure. FIG. 10 includes a module configuration of the computer 200.

In FIG. 10, the computer 200 includes a control module 510, a rendering module 520, a memory module 530, and a communication control module 540. In at least one aspect, the control module 510 and the rendering module 520 are implemented by the processor 210. In at least one aspect, a plurality of processors 210 function as the control module 510 and the rendering module 520. The memory module 530 is implemented by the memory 220 or the storage 230. The communication control module 540 is implemented by the communication interface 250.

The control module 510 controls the virtual space 11 provided to the user 5. The control module 510 defines the virtual space 11 in the HMD system 100 using virtual space data representing the virtual space 11. The virtual space data is stored in, for example, the memory module 530. In at least one embodiment, the control module 510 generates virtual space data. In at least one embodiment, the control module 510 acquires virtual space data from, for example, the server 600.

The control module 510 arranges objects in the virtual space 11 using object data representing objects. The object data is stored in, for example, the memory module 530. In at least one embodiment, the control module 510 generates virtual space data. In at least one embodiment, the control module 510 acquires virtual space data from, for example, the server 600. In at least one embodiment, the objects include, for example, an avatar object of the user 5, character objects, operation objects, for example, a virtual hand to be operated by the controller 300, and forests, mountains, other landscapes, streetscapes, or animals to be arranged in accordance with the progression of the story of the game.

The control module 510 arranges an avatar object of the user 5 of another computer 200, which is connected via the network 2, in the virtual space 11. In at least one aspect, the control module 510 arranges an avatar object of the user 5 in the virtual space 11. In at least one aspect, the control module 510 arranges an avatar object simulating the user 5 in the virtual space 11 based on an image including the user 5. In at least one aspect, the control module 510 arranges an avatar object in the virtual space 11, which is selected by the user 5 from among a plurality of types of avatar objects (e.g., objects simulating animals or objects of deformed humans).

The control module 510 identifies an inclination of the HMD 120 based on output of the HMD sensor 410. In at least one aspect, the control module 510 identifies an inclination of the HMD 120 based on output of the sensor 190 functioning as a motion sensor. The control module 510 detects parts (e.g., mouth, eyes, and eyebrows) forming the face of the user 5 from a face image of the user 5 generated by the first camera 150 and the second camera 160. The control module 510 detects a motion (shape) of each detected part.

The control module 510 detects a line of sight of the user 5 in the virtual space 11 based on a signal from the eye gaze sensor 140. The control module 510 detects a point-of-view position (coordinate values in the XYZ coordinate system) at which the detected line of sight of the user 5 and the celestial sphere of the virtual space 11 intersect with each other. More specifically, the control module 510 detects the point-of-view position based on the line of sight of the user 5 defined in the uvw coordinate system and the position and the inclination of the virtual camera 14. The control module 510 transmits the detected point-of-view position to the server 600. In at least one aspect, the control module 510 is configured to transmit line-of-sight information representing the line of sight of the user 5 to the server 600. In such a case, the control module 510 may calculate the point-of-view position based on the line-of-sight information received by the server 600.

The control module 510 translates a motion of the HMD 120, which is detected by the HMD sensor 410, in an avatar object. For example, the control module 510 detects inclination of the HMD 120, and arranges the avatar object in an inclined manner. The control module 510 translates the detected motion of face parts in a face of the avatar object arranged in the virtual space 11. The control module 510 receives line-of-sight information of another user 5 from the server 600, and translates the line-of-sight information in the line of sight of the avatar object of another user 5. In at least one aspect, the control module 510 translates a motion of the controller 300 in an avatar object and an operation object. In this case, the controller 300 includes, for example, a motion sensor, an acceleration sensor, or a plurality of light emitting elements (e.g., infrared LEDs) for detecting a motion of the controller 300.

The control module 510 arranges, in the virtual space 11, an operation object for receiving an operation by the user 5 in the virtual space 11. The user 5 operates the operation object to, for example, operate an object arranged in the virtual space 11. In at least one aspect, the operation object includes, for example, a hand object serving as a virtual hand corresponding to a hand of the user 5. In at least one aspect, the control module 510 moves the hand object in the virtual space 11 so that the hand object moves in association with a motion of the hand of the user 5 in the real space based on output of the motion sensor 420. In at least one aspect, the operation object may correspond to a hand part of an avatar object.

When one object arranged in the virtual space 11 collides with another object, the control module 510 detects the collision. The control module 510 is able to detect, for example, a timing at which a collision area of one object and a collision area of another object have touched with each other, and performs predetermined processing in response to the detected timing. In at least one embodiment, the control module 510 detects a timing at which an object and another object, which have been in contact with each other, have moved away from each other, and performs predetermined processing in response to the detected timing. In at least one embodiment, the control module 510 detects a state in which an object and another object are in contact with each other. For example, when an operation object touches another object, the control module 510 detects the fact that the operation object has touched the other object, and performs predetermined processing.

In at least one aspect, the control module 510 controls image display of the HMD 120 on the monitor 130. For example, the control module 510 arranges the virtual camera 14 in the virtual space 11. The control module 510 controls the position of the virtual camera 14 and the inclination (direction) of the virtual camera 14 in the virtual space 11. The control module 510 defines the field-of-view region 15 depending on an inclination of the head of the user 5 wearing the HMD 120 and the position of the virtual camera 14. The rendering module 520 generates the field-of-view region 17 to be displayed on the monitor 130 based on the determined field-of-view region 15. The communication control module 540 outputs the field-of-view region 17 generated by the rendering module 520 to the HMD 120.

The control module 510, which has detected an utterance of the user 5 using the microphone 170 from the HMD 120, identifies the computer 200 to which voice data corresponding to the utterance is to be transmitted. The voice data is transmitted to the computer 200 identified by the control module 510. The control module 510, which has received voice data from the computer 200 of another user via the network 2, outputs audio information (utterances) corresponding to the voice data from the speaker 180.

The memory module 530 holds data to be used to provide the virtual space 11 to the user 5 by the computer 200. In at least one aspect, the memory module 530 stores space information, object information, and user information.

The space information stores one or more templates defined to provide the virtual space 11.

The object information stores a plurality of panorama images 13 forming the virtual space 11 and object data for arranging objects in the virtual space 11. In at least one embodiment, the panorama image 13 contains a still image and/or a moving image. In at least one embodiment, the panorama image 13 contains an image in a non-real space and/or an image in the real space. An example of the image in a non-real space is an image generated by computer graphics.

The user information stores a user ID for identifying the user 5. The user ID is, for example, an internet protocol (IP) address or a media access control (MAC) address set to the computer 200 used by the user. In at least one aspect, the user ID is set by the user. The user information stores, for example, a program for causing the computer 200 to function as the control device of the HMD system 100.

The data and programs stored in the memory module 530 are input by the user 5 of the HMD 120. Alternatively, the processor 210 downloads the programs or data from a computer (e.g., server 600) that is managed by a business operator providing the content, and stores the downloaded programs or data in the memory module 530.

In at least one embodiment, the communication control module 540 communicates to/from the server 600 or other information communication devices via the network 2.

In at least one aspect, the control module 510 and the rendering module 520 are implemented with use of, for example, Unity (R) provided by Unity Technologies. In at least one aspect, the control module 510 and the rendering module 520 are implemented by combining the circuit elements for implementing each step of processing.

The processing performed in the computer 200 is implemented by hardware and software executed by the processor 410. In at least one embodiment, the software is stored in advance on a hard disk or other memory module 530. In at least one embodiment, the software is stored on a CD-ROM or other computer-readable non-volatile data recording media, and distributed as a program product. In at least one embodiment, the software may is provided as a program product that is downloadable by an information provider connected to the Internet or other networks. Such software is read from the data recording medium by an optical disc drive device or other data reading devices, or is downloaded from the server 600 or other computers via the communication control module 540 and then temporarily stored in a storage module. The software is read from the storage module by the processor 210, and is stored in a RAM in a format of an executable program. The processor 210 executes the program.

[Control Structure of HMD System]

With reference to FIG. 11, the control structure of the HMD set 110 is described. FIG. 11 is a sequence chart of processing to be executed by the system 100 according to at least one embodiment of this disclosure.

In FIG. 11, in Step S1110, the processor 210 of the computer 200 serves as the control module 510 to identify virtual space data and define the virtual space 11.

In Step S1120, the processor 210 initializes the virtual camera 14. For example, in a work area of the memory, the processor 210 arranges the virtual camera 14 at the center 12 defined in advance in the virtual space 11, and matches the line of sight of the virtual camera 14 with the direction in which the user 5 faces.

In Step S1130, the processor 210 serves as the rendering module 520 to generate field-of-view image data for displaying an initial field-of-view image. The generated field-of-view image data is output to the HMD 120 by the communication control module 540.

In Step S1132, the monitor 130 of the HMD 120 displays the field-of-view image based on the field-of-view image data received from the computer 200. The user 5 wearing the HMD 120 is able to recognize the virtual space 11 through visual recognition of the field-of-view image.

In Step S1134, the HMD sensor 410 detects the position and the inclination of the HMD 120 based on a plurality of infrared rays emitted from the HMD 120. The detection results are output to the computer 200 as motion detection data.

In Step S1140, the processor 210 identifies a field-of-view direction of the user 5 wearing the HMD 120 based on the position and inclination contained in the motion detection data of the HMD 120.

In Step S1150, the processor 210 executes an application program, and arranges an object in the virtual space 11 based on a command contained in the application program.

In Step S1160, the controller 300 detects an operation by the user 5 based on a signal output from the motion sensor 420, and outputs detection data representing the detected operation to the computer 200. In at least one aspect, an operation of the controller 300 by the user 5 is detected based on an image from a camera arranged around the user 5.

In Step S1170, the processor 210 detects an operation of the controller 300 by the user 5 based on the detection data acquired from the controller 300.

In Step S1180, the processor 210 generates field-of-view image data based on the operation of the controller 300 by the user 5. The communication control module 540 outputs the generated field-of-view image data to the HMD 120.

In Step S1190, the HMD 120 updates a field-of-view image based on the received field-of-view image data, and displays the updated field-of-view image on the monitor 130.

[Avatar Object]

Figure 12A:
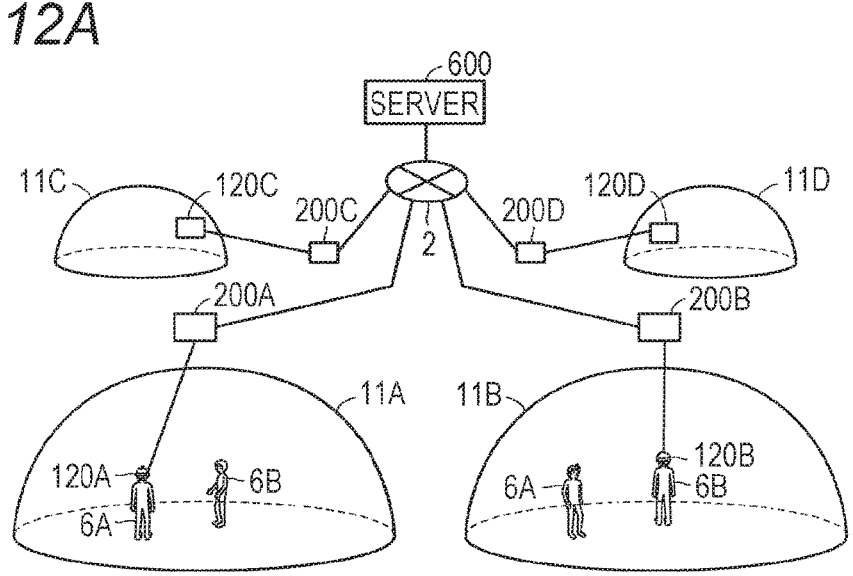
FIG. 12A A schematic diagram of HMD systems of several users sharing the virtual space interact using a network according to at least one embodiment of this disclosure.
Figure 12B:
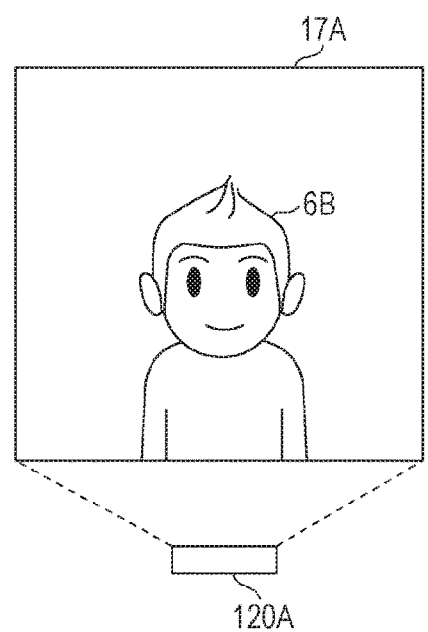
FIG. 12B A diagram of a field-of-view image of a user 5A in FIG. 12A according to at least one embodiment of this disclosure.

With reference to FIG. 12A and FIG. 12B, an avatar object according to at least one embodiment is described. FIG. 12 and FIG. 12B are diagrams of avatar objects of respective users 5 of the HMD sets 110A and 110B. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

FIG. 12A is a schematic diagram of HMD systems of several users sharing the virtual space interact using a network according to at least one embodiment of this disclosure. Each HMD 120 provides the user 5 with the virtual space 11. Computers 200A to 200D provide the users 5A to 5D with virtual spaces 11A to 11D via HMDs 120A to 120D, respectively. In FIG. 12A, the virtual space 11A and the virtual space 11B are formed by the same data. In other words, the computer 200A and the computer 200B share the same virtual space. An avatar object 6A of the user 5A and an avatar object 6B of the user 5B are present in the virtual space 11A and the virtual space 11B. The avatar object 6A in the virtual space 11A and the avatar object 6B in the virtual space 11B each wear the HMD 120. However, the inclusion of the HMD 120A and HMD 120B is only for the sake of simplicity of description, and the avatars do not wear the HMD 120A and HMD 120B in the virtual spaces 11A and 11B, respectively.

In at least one aspect, the processor 210A arranges a virtual camera 14A for photographing a field-of-view region 17A of the user 5A at the position of eyes of the avatar object 6A.

FIG. 12B is a diagram of a field of view of a HMD according to at least one embodiment of this disclosure. FIG. 12(B) corresponds to the field-of-view region 17A of the user 5A in FIG. 12A. The field-of-view region 17A is an image displayed on a monitor 130A of the HMD 120A. This field-of-view region 17A is an image generated by the virtual camera 14A. The avatar object 6B of the user 5B is displayed in the field-of-view region 17A. Although not included in FIG. 12B, the avatar object 6A of the user 5A is displayed in the field-of-view image of the user 5B.

In the arrangement in FIG. 12B, the user 5A can communicate to/from the user 5B via the virtual space 11A through conversation. More specifically, voices of the user 5A acquired by a microphone 170A are transmitted to the HMD 120B of the user 5B via the server 600 and output from a speaker 180B provided on the HMD 120B. Voices of the user 5B are transmitted to the HMD 120A of the user 5A via the server 600, and output from a speaker 180A provided on the HMD 120A.

The processor 210A translates an operation by the user 5B (operation of HMD 120B and operation of controller 300B) in the avatar object 6B arranged in the virtual space 11A. With this, the user 5A is able to recognize the operation by the user 5B through the avatar object 6B.

Figure 13:
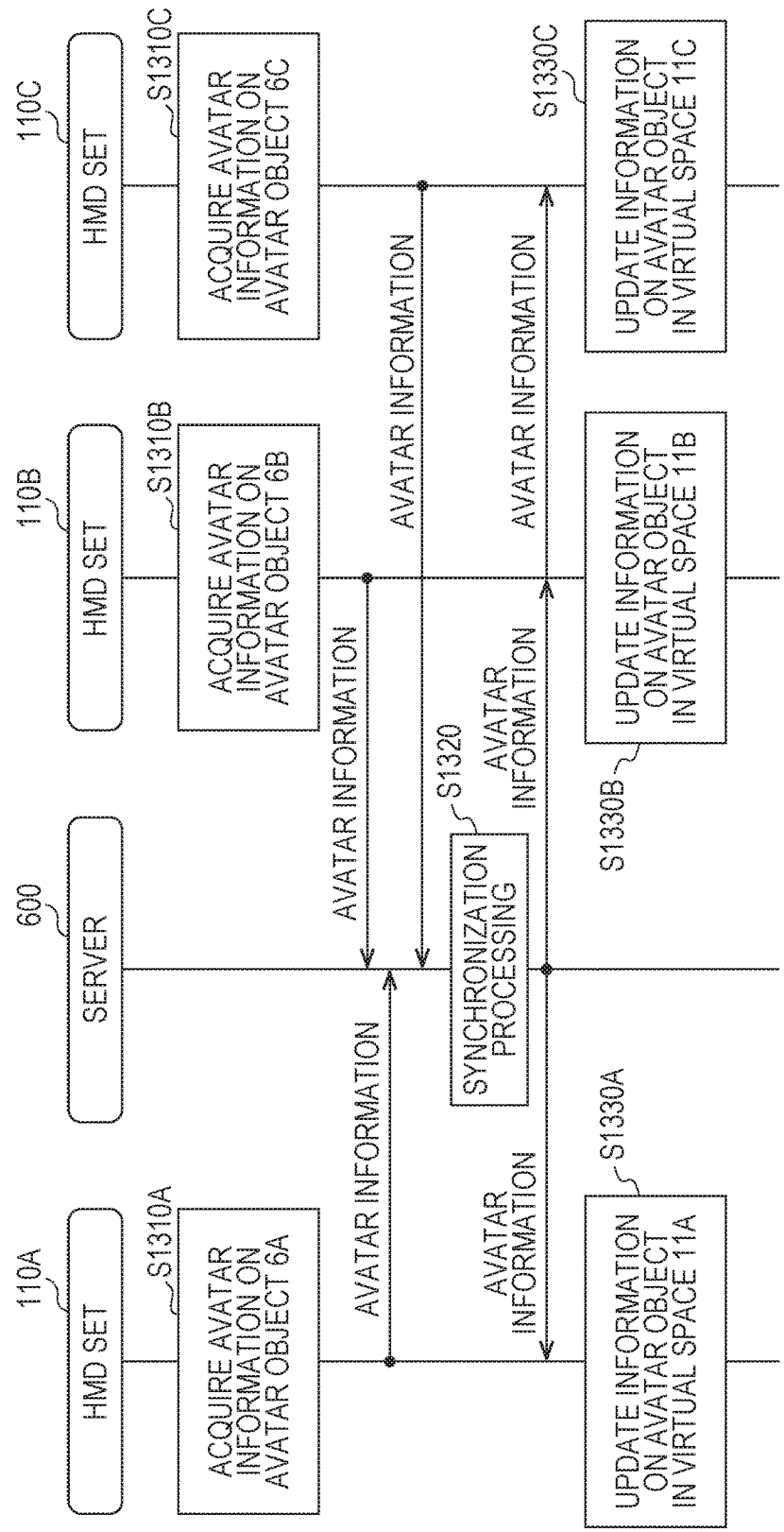
FIG. 13 A sequence diagram of processing to be executed by a system including an HMD interacting in a network according to at least one embodiment of this disclosure.

FIG. 13 is a sequence chart of processing to be executed by the system 100 according to at least one embodiment of this disclosure. In FIG. 13, although the HMD set 110D is not included, the HMD set 110D operates in a similar manner as the HMD sets 110A, 110B, and 110C. Also in the following description, a reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively.

In Step S1310A, the processor 210A of the HMD set 110A acquires avatar information for determining a motion of the avatar object 6A in the virtual space 11A. This avatar information contains information on an avatar such as motion information, face tracking data, and sound data. The motion information contains, for example, information on a temporal change in position and inclination of the HMD 120A and information on a motion of the hand of the user 5A, which is detected by, for example, a motion sensor 420A. An example of the face tracking data is data identifying the position and size of each part of the face of the user 5A. Another example of the face tracking data is data representing motions of parts forming the face of the user 5A and line-of-sight data. An example of the sound data is data representing sounds of the user 5A acquired by the microphone 170A of the HMD 120A. In at least one embodiment, the avatar information contains information identifying the avatar object 6A or the user 5A associated with the avatar object 6A or information identifying the virtual space 11A accommodating the avatar object 6A. An example of the information identifying the avatar object 6A or the user 5A is a user ID. An example of the information identifying the virtual space 11A accommodating the avatar object 6A is a room ID. The processor 210A transmits the avatar information acquired as described above to the server 600 via the network 2.

In Step S1310B, the processor 210B of the HMD set 110B acquires avatar information for determining a motion of the avatar object 6B in the virtual space 11B, and transmits the avatar information to the server 600, similarly to the processing of Step S1310A. Similarly, in Step S1310C, the processor 210C of the HMD set 110C acquires avatar information for determining a motion of the avatar object 6C in the virtual space 11C, and transmits the avatar information to the server 600.

In Step S1320, the server 600 temporarily stores pieces of player information received from the HMD set 110A, the HMD set 110B, and the HMD set 110C, respectively. The server 600 integrates pieces of avatar information of all the users (in this example, users 5A to 5C) associated with the common virtual space 11 based on, for example, the user IDs and room IDs contained in respective pieces of avatar information. Then, the server 600 transmits the integrated pieces of avatar information to all the users associated with the virtual space 11 at a timing determined in advance. In this manner, synchronization processing is executed. Such synchronization processing enables the HMD set 110A, the HMD set 110B, and the HMD 120C to share mutual avatar information at substantially the same timing.

Next, the HMD sets 110A to 110C execute processing of Step S1330A to Step S1330C, respectively, based on the integrated pieces of avatar information transmitted from the server 600 to the HMD sets 110A to 110C. The processing of Step S1330A corresponds to the processing of Step S1180 of FIG. 11.

In Step S1330A, the processor 210A of the HMD set 110A updates information on the avatar object 6B and the avatar object 6C of the other users 5B and 5C in the virtual space 11A. Specifically, the processor 210A updates, for example, the position and direction of the avatar object 6B in the virtual space 11 based on motion information contained in the avatar information transmitted from the HMD set 110B. For example, the processor 210A updates the information (e.g., position and direction) on the avatar object 6B contained in the object information stored in the memory module 530. Similarly, the processor 210A updates the information (e.g., position and direction) on the avatar object 6C in the virtual space 11 based on motion information contained in the avatar information transmitted from the HMD set 110C.

In Step S1330B, similarly to the processing of Step S1330A, the processor 210B of the HMD set 110B updates information on the avatar object 6A and the avatar object 6C of the users 5A and 5C in the virtual space 11B. Similarly, in Step S1330C, the processor 210C of the HMD set 110C updates information on the avatar object 6A and the avatar object 6B of the users 5A and 5B in the virtual space 11C.

[Detailed Configuration of Modules]

Figure 14:
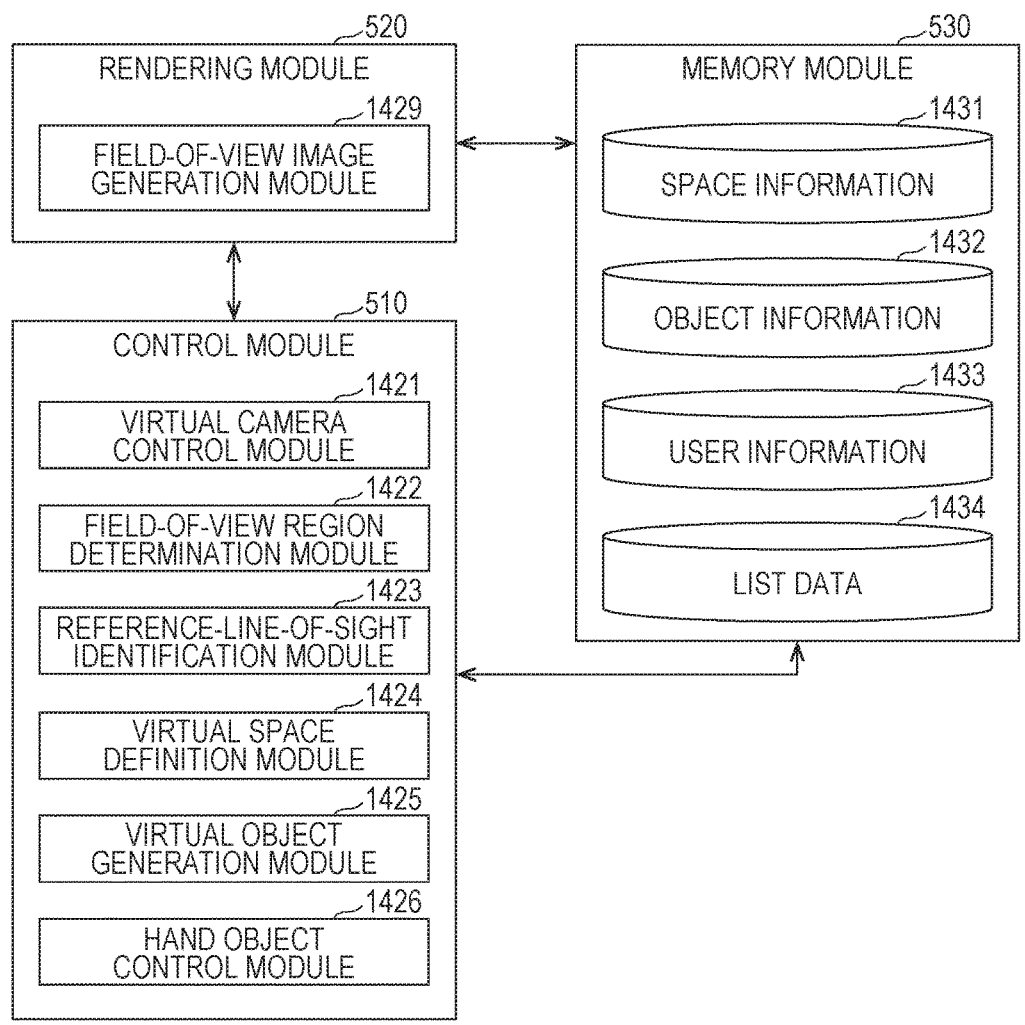
FIG. 14 A block diagram of a detailed configuration of modules of the computer according to at least one embodiment of this disclosure.

Now, with reference to FIG. 14, a description is given of a detailed configuration of modules of the computer 200. FIG. 14 is a block diagram of the detailed configuration of modules of the computer 200 according to at least one embodiment of this disclosure.

In FIG. 14, the control module 510 includes a virtual camera control module 1421, a field-of-view region determination module 1422, a reference-line-of-sight identification module 1423, a virtual space definition module 1424, a virtual object generation module 1425, and a hand object control module 1426. The rendering module 520 includes a field-of-view image generation module 1429. The memory module 530 stores space information 1431, object information 1432, user information 1433, and list data 1434.

In at least one aspect, the control module 510 controls display of an image on the monitor 130 of the HMD 120. The virtual camera control module 1421 arranges the virtual camera 14 in the virtual space 11, and controls, for example, the behavior and direction of the virtual camera 14. The field-of-view region determination module 1422 defines the field-of-view region 15. The field-of-view image generation module 1429 generates a field-of-view image 17 to be displayed on the monitor 130 based on the determined field-of-view region 15.

The reference-line-of-sight identification module 1423 identifies the line of sight of the user 5 based on the signal from the eye gaze sensor 140.

The control module 510 controls the virtual space 11 to be provided to the user 5. The virtual space definition module 1424 generates virtual space data representing the virtual space 11, to thereby define the virtual space 11 in the HMD set 110.

The virtual object generation module 1425 generates a target object to be displayed in the virtual space 11. As an example, the target objects include an avatar of a user of another HMD set 110 on the network 2 (e.g., FIG. 1), the interior of the chat room, and/or accessories arranged in the chat room. In other examples, the target objects include, for example, landscapes including forests, mountains, and others, and animals, which are displayed in accordance with the progression of the story of the game.

The hand object control module 1426 arranges the hand object in the virtual space 11. In the following description, the hand object arranged in the virtual space 11 is also referred to as "virtual hand". The hand object corresponds to, for example, a right hand or a left hand of the user 5 holding the controller 300. In at least one aspect, the hand object control module 1426 generates data for arranging a left hand object or a right hand object in the virtual space 11. In at least one aspect, the hand object control module 1426 generates data for indicating motion of a left hand object or a right hand object rotating another object in response to operation of the controller 300 by the user 5. This operation includes, for example, a hand holding a steering wheel represented as an object rotating the steering wheel.

The space information 1431 stores one or more templates that are defined to provide the virtual space 11.

The object information 1432 stores content to be reproduced in the virtual space 11 and information for displaying an object to be used in the content. The content may include, for example, a game or content representing a scenery similar to that of the real society.

The user information 1433 stores, for example, a program for causing the computer 200 to function as an apparatus for controlling the HMD set 110, and an application program that uses each content held in the object information 1432. The data and programs to be stored in the memory module 530 are input by the user of the HMD 120, or are downloaded by the processor 210 from a computer (e.g., server 600) operated by an operator providing the content, and stored in the memory module 530.

[Summary of Disclosure]

Figure 15:
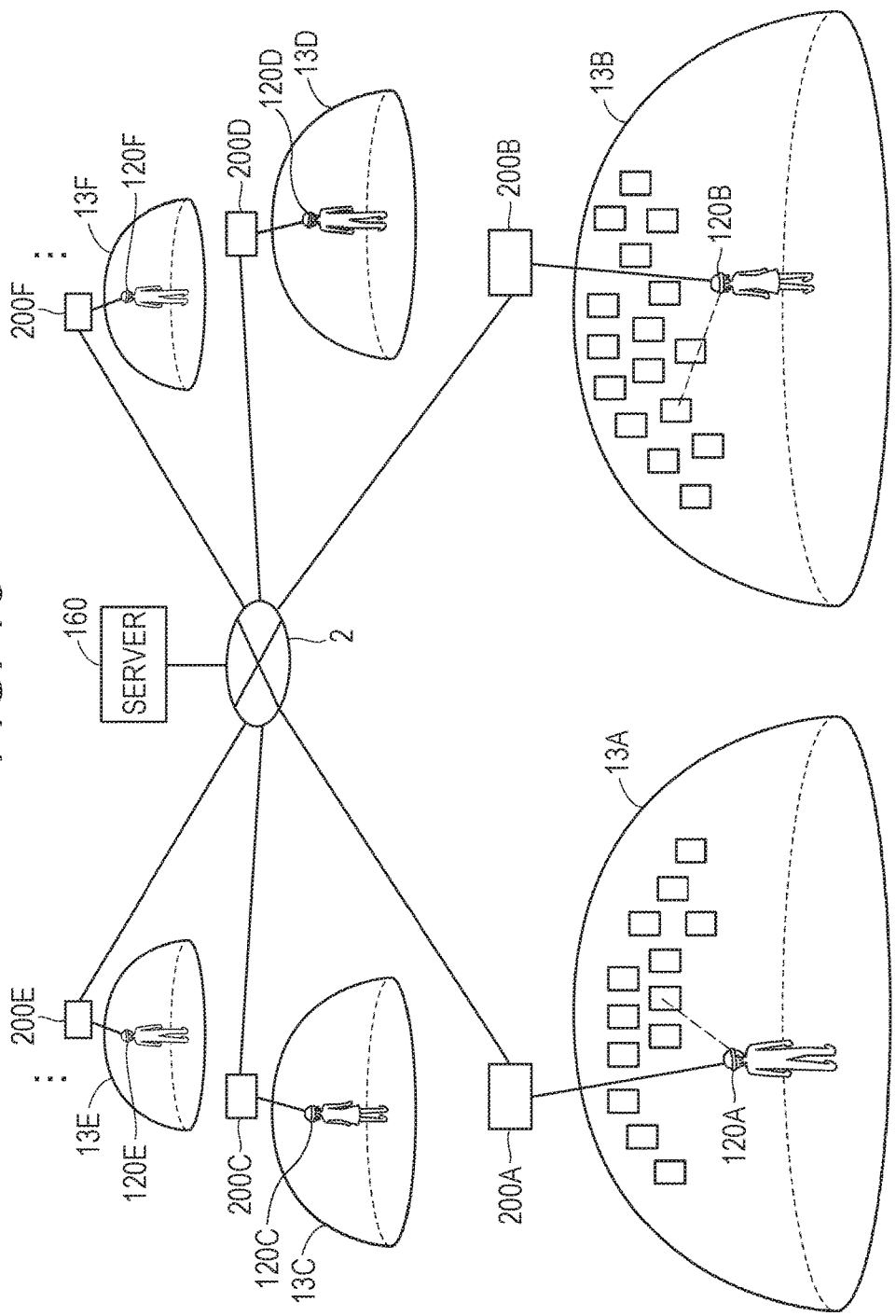
FIG. 15 A diagram of an outline of a matching system according to at least one embodiment of this disclosure.

FIG. 15 is a diagram of an outline of the matching system according to at least one embodiment of this disclosure. In the matching system, the server 600 provides a virtual space to each of a plurality of users, and matches two or more users from among the plurality of users.

More specifically, the matching system provides a virtual space to each user by providing to each computer to be used by a user a virtual space in which a virtual space image is to be developed. In the following, as an example, there is described a case in which there are six HMD sets 110, but the number of HMD sets 110 is not limited thereto. In FIG. 15, the computers used by the users are indicated as computers 200A to 200F. The virtual space to be developed by each of the computers 200A to 200F is indicated as a virtual space 11A to 11F, and the virtual space image to be developed in each virtual space is indicated as a virtual space image 13A to 13F.

The server 600 is able to communicate to/from the computers 200A to 200F via the network 2. Each of the computers 200A to 200F is connected to a head-mounted device (hereinafter referred to as "HMD") 120A to 120F to be worn by each user. The computers 200A to 200F transmit inputs detected by the respective HMDs 120A to 120F to the server 600. The server 600 matches two or more users from among the plurality of users in the matching system based on those inputs.

Figure 16:
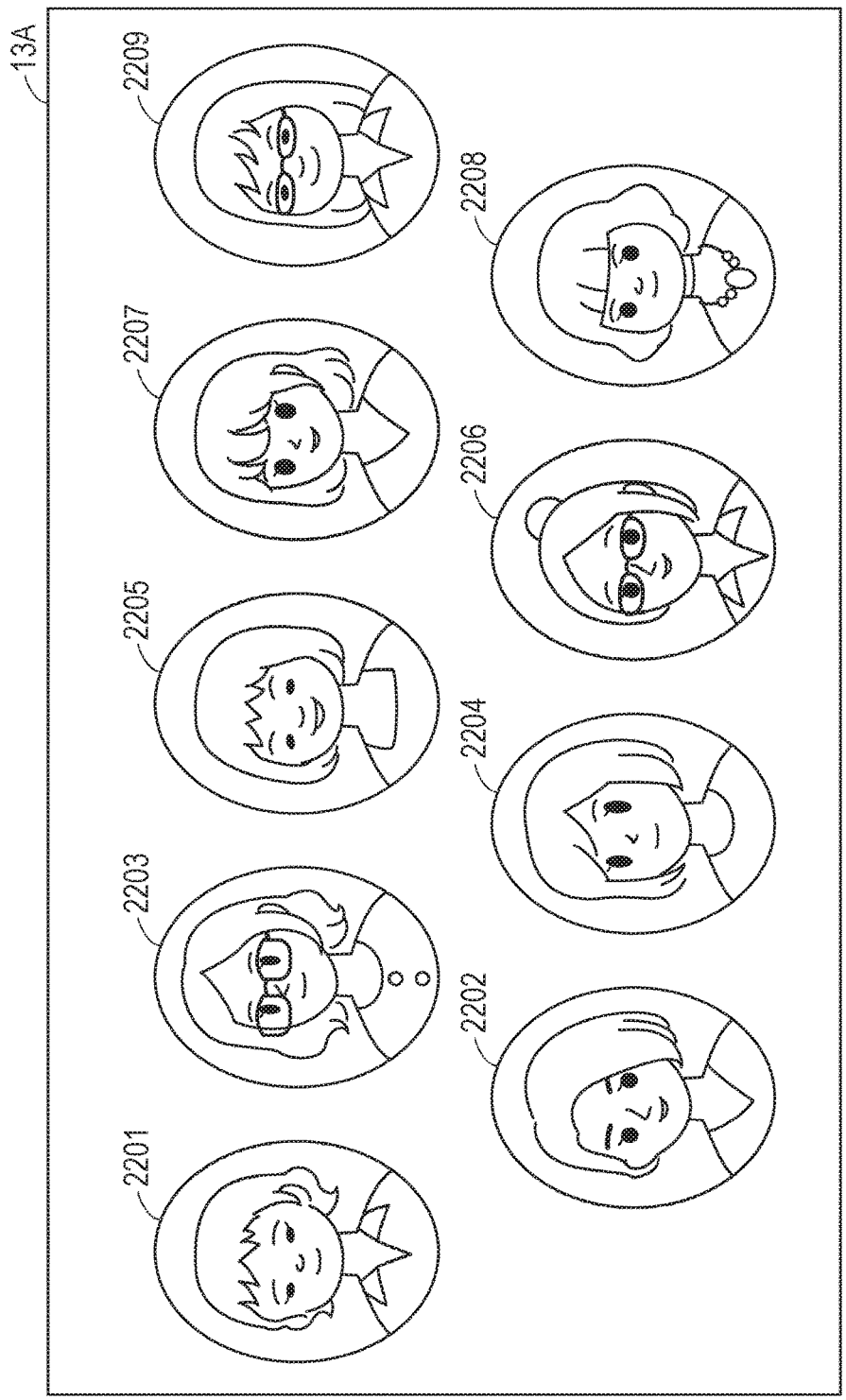
FIG. 16 A schematic diagram of an example of a virtual space image according to at least one embodiment of this disclosure.

FIG. 16 is a schematic diagram of an example of a virtual space image according to at least one embodiment of this disclosure. The virtual space image 13A of FIG. 16 includes nine images 2201 to 2209. Each of the images 2201 to 2209 represents one of nine users selected from among the plurality of users participating in the matching system as potential matches for a user (hereinafter referred to as "user 5A") to which the virtual space 11A is to be provided.

Figure 17:
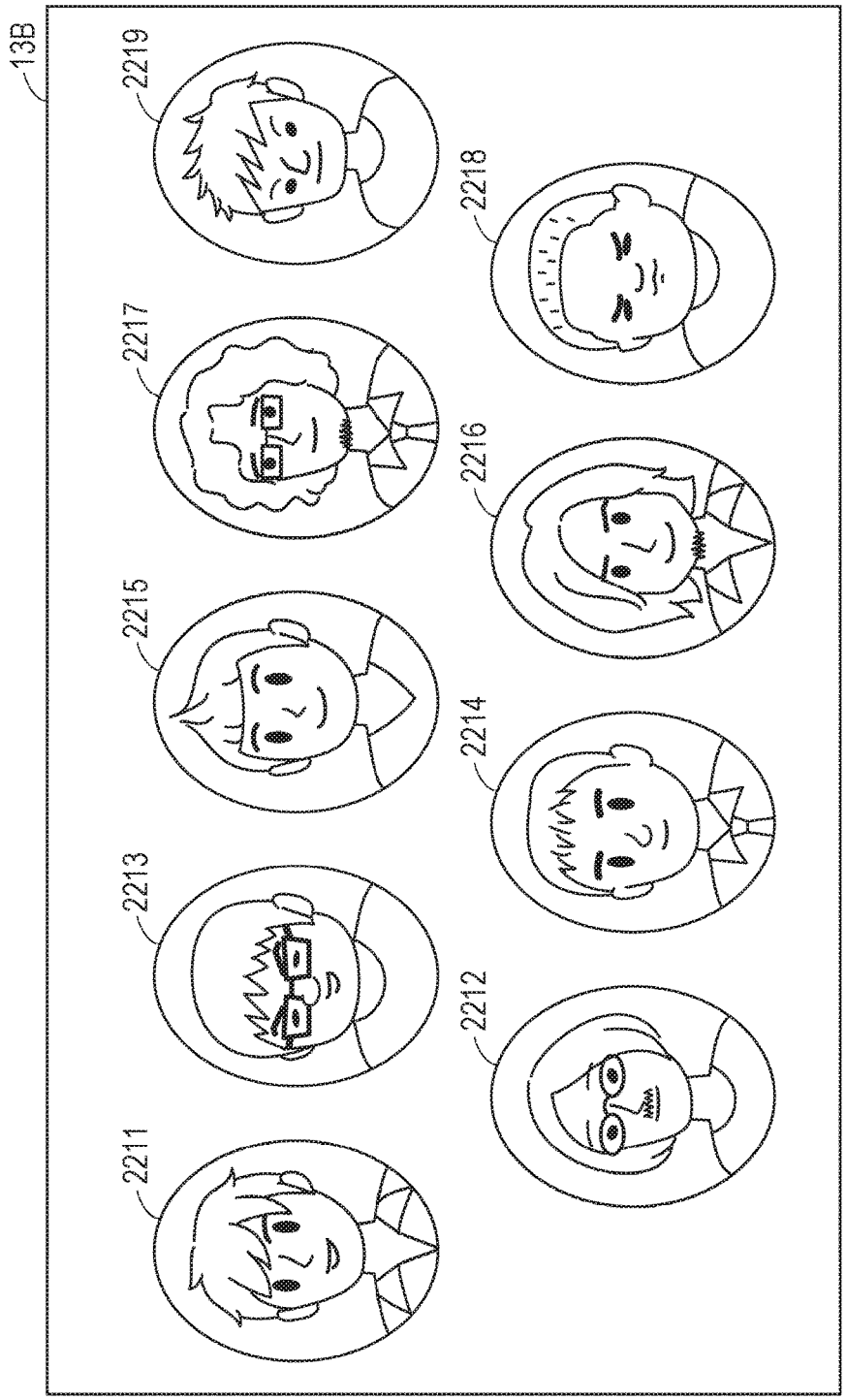
FIG. 17 A schematic diagram of an example of the virtual space image according to at least one embodiment of this disclosure.

FIG. 17 is a schematic diagram of an example of the virtual space image according to at least one embodiment of this disclosure. The virtual space image 13B of FIG. 17 includes nine images 2211 to 2219. Each of the images 2211 to 2219 represents one of the nine users selected from among the plurality of users participating in the matching system as potential matches for a user (hereinafter referred to as "user 5B") to which the virtual space 11B is to be provided.

Among the images 2201 to 2209 of FIG. 16, the image 2204 represents the user 5B, and among the images 2211 to 2219 of FIG. 17, the image 2215 represents the user 5A, a match between the user 5A and the user 5B is established on condition that the server 600 (FIG. 1) has received input indicating that the image 2204 has been selected by the user 5A for a fixed period or longer, and input indicating that the image 2205 has been selected by the user 5B for a fixed period or longer.

In at least one example, the server 600 establishes a match between the user 5A and the user 5B, and then assigns one chat room to the user 5A and the user 5B. Assigning one chat room to the user 5A and the user 5B corresponds to opening a chat room for the user 5A and the user 5B. FIG. 18 is a diagram of an example of the virtual space image representing the opened chat room according to at least one embodiment of this disclosure.

In FIG. 18, there are the virtual space image 13A in the virtual space to be provided to the user 5A and the virtual space image 13B in the virtual space to be provided to the user 5B. An area 2231 in the virtual space image 13A displays a chat room including an avatar object 6B representing the user 5B. An area 2241 in the virtual space image 13B displays a chat room including an avatar object 6A representing the user 5A. An avatar object is an example of an object representing a user. In the following, the avatar objects may be simply referred to as avatars. Information associated with the user corresponding to each avatar (e.g., information in the user information of FIG. 20 to be described later) can be displayed together with that avatar on the virtual space screen.

The area 2231 represents an image of a venue as viewed from the viewpoint of the user 5A, and the area 2241 represents an image of a venue as viewed from the viewpoint of the user 5B. The server 600 controls operation of the avatar object 6A in the area 2241 in accordance with the motion of the user 5A and controls operation of the avatar object 6B in the area 2231 in accordance with the motion of the user 5B. As a result, a virtual space representing the chat room is provided to each of the user 5A and the user 5B.

[Data Structure]

The data structure of server 600 is now described with reference to FIG. 19. FIG. 19 is a schematic table of an example of the information content stored in the storage 630 (user information storage unit) of the server 600 according to at least one embodiment of this disclosure. In the matching system according to at least one embodiment of this disclosure, the server 600 generates an application-related instruction to the computer 200 of each HMD set 110 by using information on each of the plurality of users participating in the matching system.

As shown in FIG. 19, the storage 630 stores information (user ID) unique to each user. In the storage 630, five types of information (user information, viewing setting information, viewed setting information, viewed history, and personal setting information) are stored in association with each user ID.

FIG. 20 is a schematic table of an example of the "user information" content of FIG. 19 according to at least one embodiment of this disclosure. As shown in FIG. 20, the user information includes a display name, a gender, an age, a desired gender to be introduced, a desired age to be introduced, and an Internet protocol (IP) address. The display name is the name that is displayed when each user is displayed as a potential match in the matching application. The gender is the sex of each user. The age is the age of each user. The desired gender to be introduced is information for specifying the user gender that each user desires as a potential match. The desired age to be introduced is information for specifying the user age (age group) that each user desires as a potential match. The IP address is the latest IP address through which the computer 200 of the HMD set 110 used by each user connected to the network 2.

Other than the IP address, all of the information included in the user information of FIG. 20 is registered by each user, for example. More specifically, each user registers the various pieces of information in the server 600 via the computer 200, for example. The IP address is identified and stored, for example, by the processor 610 of the server 600.

FIG. 21 is a schematic table of an example of the "viewing setting information" content of FIG. 19 according to at least one embodiment of this disclosure. As shown in FIG. 21, the viewing setting information includes a daily viewing count setting and a viewed notification setting.

The daily viewing count setting is information for defining the number of potential matches that each user is permitted to view per day. The value of the daily viewing count setting is determined in advance, for example. The processor 610 may change the value of the daily viewing count setting for each user in response to input from the computer 200. The matching system may change the value of the daily viewing count setting in response to, for example, input to the computer 200 by a user of predetermined information. This input may be input for payment of a fee to the operator of the matching system. In other words, the matching system may change the value of the daily viewing count setting by charging the user.

The viewed notification setting is information indicating, for each user, the presence/absence of a special notification in the virtual space to be provided to the user. An example of the special notification is notification of an occurrence of a situation in which, in the matching system, another user has continuously designated the avatar corresponding to the user for a fixed period or longer. The value of the viewed notification setting is "ON" or "OFF". When the value is "ON", the notification is issued. When the value is "OFF", the notification is not issued.

More specifically, in a case in which a virtual space is provided to each of the user 5A and the user 5B, when the user 5B has continuously designated the avatar corresponding to the user 5A for a fixed period or longer, the server 600 notifies the user 5A of the occurrence of that situation. The server 600 acquires, from the respective computers 200 of the HMD set 110 used by the users 5A and 5B, information representing which avatar is designated by each of the users 5A and 5B. When the value of the viewed notification setting for the user 5A is "ON" and the user 5B has continuously designated the user 5A for a fixed period or longer, the server 600 transmits the occurrence of that situation to the computer 200 of the HMD set 110 used by the user 5A. As a result, the computer 200 notifies the occurrence of the situation. The notification mode is described later with reference to FIG. 33.

The value "OFF", for example, is set by default as the value of the viewed notification setting. The processor 610 may change the value of the viewed notification setting for each user in response to input from the computer 200. The matching system may change the value of the viewed notification setting from "OFF" to "ON" in response to, for example, the user inputting predetermined information to the computer 200. This input may be input for payment of a fee to the operator of the matching system. In other words, the matching system may change the value of the viewed notification setting from "OFF" to "ON" in accordance with a fee paid by the user in response to being charged.

FIG. 22 is a schematic table of an example of the "viewed setting information" content of FIG. 19 according to at least one embodiment of this disclosure. The viewed setting information includes a priority arrangement setting and a priority introduction setting.

The priority arrangement setting defines a degree to which the arrangement of the avatar corresponding to that user is prioritized in the virtual space. The value of the priority arrangement setting is, for example, a rank 1 to a rank 5, with the rank 1 having the highest priority and the rank 5 having the lowest priority. The server 600 instructs that, for each computer 200, in the display of avatars corresponding to the users of respective potential matches, the avatar of a user having a higher priority be arranged at a position that is easier to view in the virtual space than the avatar of a user having a lower priority.

The processor 610 may change the value of the priority arrangement setting for each user in response to input from the computer 200. In other words, the matching system may change the value of the priority arrangement setting by charging the user.

The priority introduction setting defines a selection range of the potential matches for the user. For example, the value of the priority introduction setting is a rank 1 to a rank 5, with the rank 1 having the highest priority and the rank 5 having the lowest priority. The server 600 selects users corresponding to the "desired gender to be introduced" and the "desired age to be introduced" (FIG. 20) of the user as potential matches for that user. When selecting the potential matches, the server 600 selects users from a wider range when the priority defined by the priority introduction setting is higher. For example, the server 600 includes, on condition that the priority defined by the priority introduction setting of the user 5A is equal to or higher than a fixed level (e.g., rank 3, rank 2, or rank 1), users generally regarded as being celebrities, such as entertainers, in the potential match users for the user 5A.

FIG. 23 is a schematic table of an example of the "viewed history" content of FIG. 19 according to at least one embodiment of this disclosure. In the viewed history, a viewer ID is associated with a viewing time. In the example of FIG. 23, the viewing time "2016. 9.1 22:02" and the viewer ID "000046" are associated with each other. This means that at 22:02 on Sep. 1, 2016, the user having the user ID 000046 designated the user corresponding to the viewed history of FIG. 23.

An example of registration of information in the viewed history is now described. When a user using the HMD set 110 designates an avatar displayed in the virtual space, the computer 200 of that HMD set 110 notifies the server 600 of the designated avatar. In response to the notification, the server 600 registers in the "viewed history" of the user corresponding to the designated avatar, together with the notification time (viewing time), the user ID of the user using the HMD set 110 that issued the notification as the viewer ID. More specifically, when the user 5B designates the user 5A, the user ID of the user 5B is registered as the "viewer ID" together with the notification time in the "viewed history" of the user 5A. The computer 200 of the HMD set 110 may issue the above-mentioned notification to the server 600 when the avatar is continuously designated for a predetermined period of time.

FIG. 24 is a schematic table of an example of the "personal setting information" content of FIG. 19 according to at least one embodiment of this disclosure. The personal setting information includes an avatar setting and a space setting.

The avatar setting specifies the avatar of the relevant user. An example of the avatar setting is an image file (in FIG. 24, file having the file name "image file 01"). For example, each user registers an image in the server 600 via the computer 200. The registered image is, for example, a photograph of the face of the user. The computer 200 of each HMD set 110 of the matching system presents in the virtual space the image registered by the user as the avatar corresponding to the relevant user. In response to the user inputting predetermined information to the computer 200, the server 600 may also perform special processing on the image. This input may be input for payment of a fee to the operator of the matching system. In other words, the matching system may be configured to charge a user to perform special processing on the image registered by the user.

The space setting specifies the interior and accessories of the chat room unique to the relevant user. In the example of FIG. 24, the space setting includes a "room 02" and a "table 01". The "room 02" specifies the type of the interior of the chat room. The "table 01" specifies the type of accessory to be arranged in the chat room. In response to, for example, the user inputting predetermined information to the computer 200, the server 600 may register a new item in the space setting. The server 600 may also permit a special item to be registered in the space setting in response to, for example, the user inputting predetermined information to the computer 200. In other words, the matching system may be configured to allow a user to add items or to register special items in the space setting by charging the user.

[Control Structure]

Figure 25:
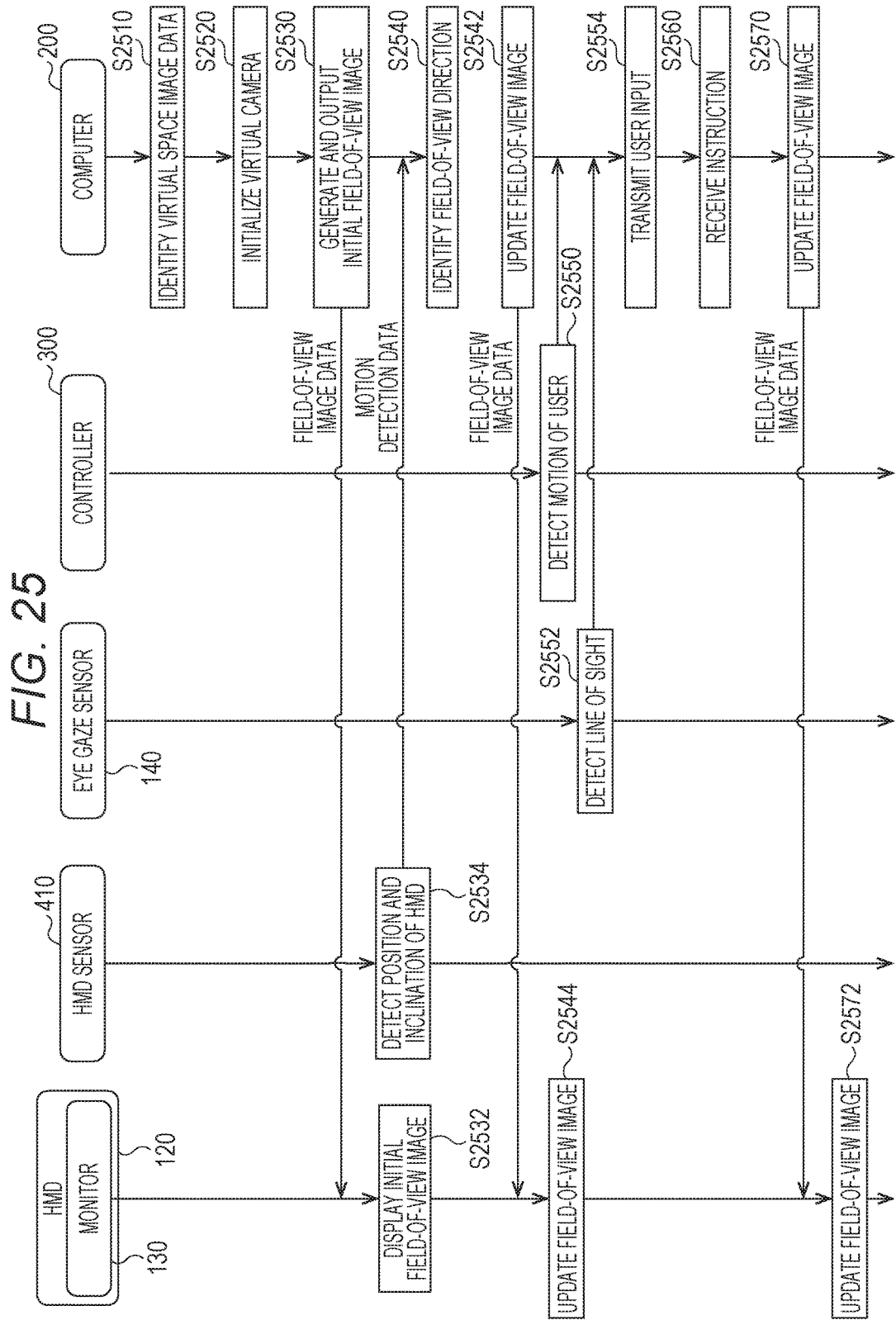
FIG. 25 A sequence chart of processing to be executed by a system including an HMD according to at least one embodiment of this disclosure.

With reference to FIG. 25, the control structure of the HMD set 110 is described. FIG. 25 is a sequence chart of processing to be executed by the HMD set 110 according to at least one embodiment of this disclosure.

In Step S2510, the processor 210 serves as the virtual space definition module 1424 to identify virtual space image data.

In Step S2520, the processor 510 initializes the virtual camera 14. For example, the processor 210 arranges the virtual camera 14 at the center defined in advance in the virtual space 11, and matches the line of sight of the virtual camera 14 with the direction in which the user 5 faces.

In Step S2530, the processor 210 serves as the field-of-view image generation module 1429 to generate field-of-view image data for displaying an initial field-of-view image. The generated field-of-view image data is transmitted to the HMD 120 by a communication control module 540 via the field-of-view image generation module 1429.

In Step S2532, the monitor 130 of the HMD 120 displays the field-of-view image based on the signal received from the computer 200. The user 5 wearing the HMD 120 may recognize the virtual space 11 through visual recognition of the field-of-view image.

In Step S2534, the HMD sensor 410 detects the position and the inclination of the HMD 120 based on a plurality of infrared rays emitted from the HMD 120. The detection results are transmitted to the computer 200 as motion detection data.

In Step S2540, the processor 210 identifies a field-of-view direction of the user 5 wearing the HMD 120 based on the position and inclination of the HMD 120. The processor 210 executes an application program, and displays an object in the virtual space 11 based on a command contained in the application program. The user 5 enjoys the content visible in the virtual space 11 by executing that application program. In at least one aspect, the content is a matchmaking application. In the matchmaking application, two or more avatars are displayed and input is received for designating one or more avatars from the two or more displayed avatars. The matchmaking application transmits the specified input to the server 600. The server 600 matches, from among the plurality of users, two or more users based on inputs from the matchmaking application executed by each of the plurality of users.

In Step S2542, the processor 210 updates the field-of-view image based on the state of the designated virtual user. Then, the processor 210 outputs to the HMD 120 data (field-of-view image data) for displaying the updated view image.

In Step S2544, the monitor 130 of the HMD 120 updates the field-of-view image based on the received field-of-view image data and displays the updated field-of-view image.

In Step S2550, the controller 300 detects motion of the user 5. A signal indicating the detected operation is transmitted to the computer 200. The signal contains operation for specifying one or more avatars among two or more displayed avatars. More specifically, the signal contains operation for displaying a virtual hand and representing motion of touching one or more avatars among the two or more displayed avatars with the virtual hand.

In Step S2552, the eye gaze sensor 140 detects the line of sight of the user 5. A signal indicating the detection value of the detected line of sight is transmitted to the computer 200. In this specification, the fact that the point-of-gaze is placed on the avatar is treated as "designating the avatar".

In other words, in at least one embodiment, the computer 200 treats, as designation of the avatar by the virtual user, the fact that the user 5 has touched the avatar with his/her virtual hand by operating the controller 300 and/or the fact that the point-of-gaze of the user 5 has been placed on the avatar.

In Step S2554, the processor 210 transmits to the server 600 input indicating that the virtual user has designated the avatar.

The server 600 receives from the processor 210 of each computer 200 input about which user in the virtual space each virtual user has designated. Based on the fact that the input satisfies a predetermined condition, the server 600 matches two or more users from among the plurality of users participating in the matching system. The server 600 transmits a predetermined instruction to the processor 210 of the computer 200 used by the matched users.

In Step S2560, the processor 210 receives the predetermined instruction from the server 600.

In Step S2570, the processor 210 updates the field-of-view image in accordance with the instruction from the server 600, and outputs data (field-of-view image data) for displaying the updated field-of-view image to the HMD 120.

In Step S2572, the monitor 130 of the HMD 120 updates a field-of-view image based on the received field-of-view image data, and displays the updated field-of-view image.

[Processing Flow]

In the matching system, each of the plurality of users sees the virtual space by using the HMD set 110. The virtual space image provided to the user includes a virtual space image for viewing the potential match users. A virtual space image representing the chat room may also be provided to the user after a match with another user is established.

In the matching system, the server 600 executes processing for providing potential matches to each user and processing for matching users with each other. The flow of each process is now described below.

(1) Provision of Potential Matches

Figure 26:
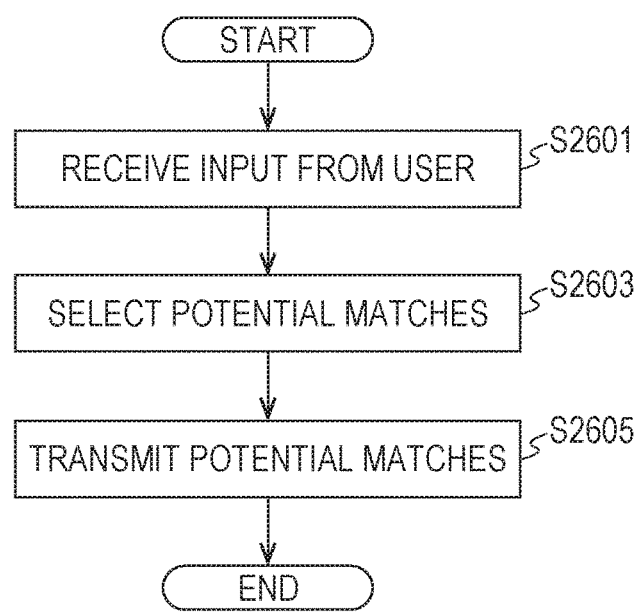
FIG. 26 A flowchart of processing by the server for providing potential matches to each user according to at least one embodiment of this disclosure.

FIG. 26 is a flowchart of processing by the server 600 for providing potential matches to each user according to at least one embodiment of this disclosure. The processor 610 implements the processing by, for example, executing a program stored in the memory 620.

In FIG. 26, in Step S2601, the processor 610 receives information specifying a user input from the computer 200 of each HMD set 110 of the matching system. The input received in Step S2601 represents, for example, a request for provision of potential matches.

In Step S2603, the processor 610 selects potential matches for the user (provision destination user) who is using the computer 200 for which the input has been received in Step S2601.

The selection of the potential matches in Step S2603 is implemented as follows, for example. Specifically, the processor 610 selects, from among the plurality of users, potential matches for the provision destination user by referring to the user information (FIG. 20) on the plurality of users and the provision destination user registered in the matching system. For example, the processor 610 refers to the "desired gender to be introduced" and the "desired age to be introduced" of the provision destination user, and then selects, as the potential matches, the users whose gender matches the "desired gender to be introduced" and whose age is included in the "desired age to be introduced" from the plurality of users.

In Step S2605, the processor 610 transmits the potential matches selected in Step S2603 to the computer 200 for which the input has been received in Step S2601. The processor 610 then ends the processing of FIG. 26.

In Step S2560 (FIG. 25), the computer 200 receives the potential matches transmitted in Step S2605. In response to this, in Step S2570, the computer 200 generates field-of-view image data for displaying the received potential matches, and transmits the generated field-of-view image data to the HMD 120. In response to that, in Step S2572, the monitor 130 of the HMD 120 displays an image for presenting the potential matches in the manner described with reference to FIG. 16, for example.

(2) User Matching

Figure 27:
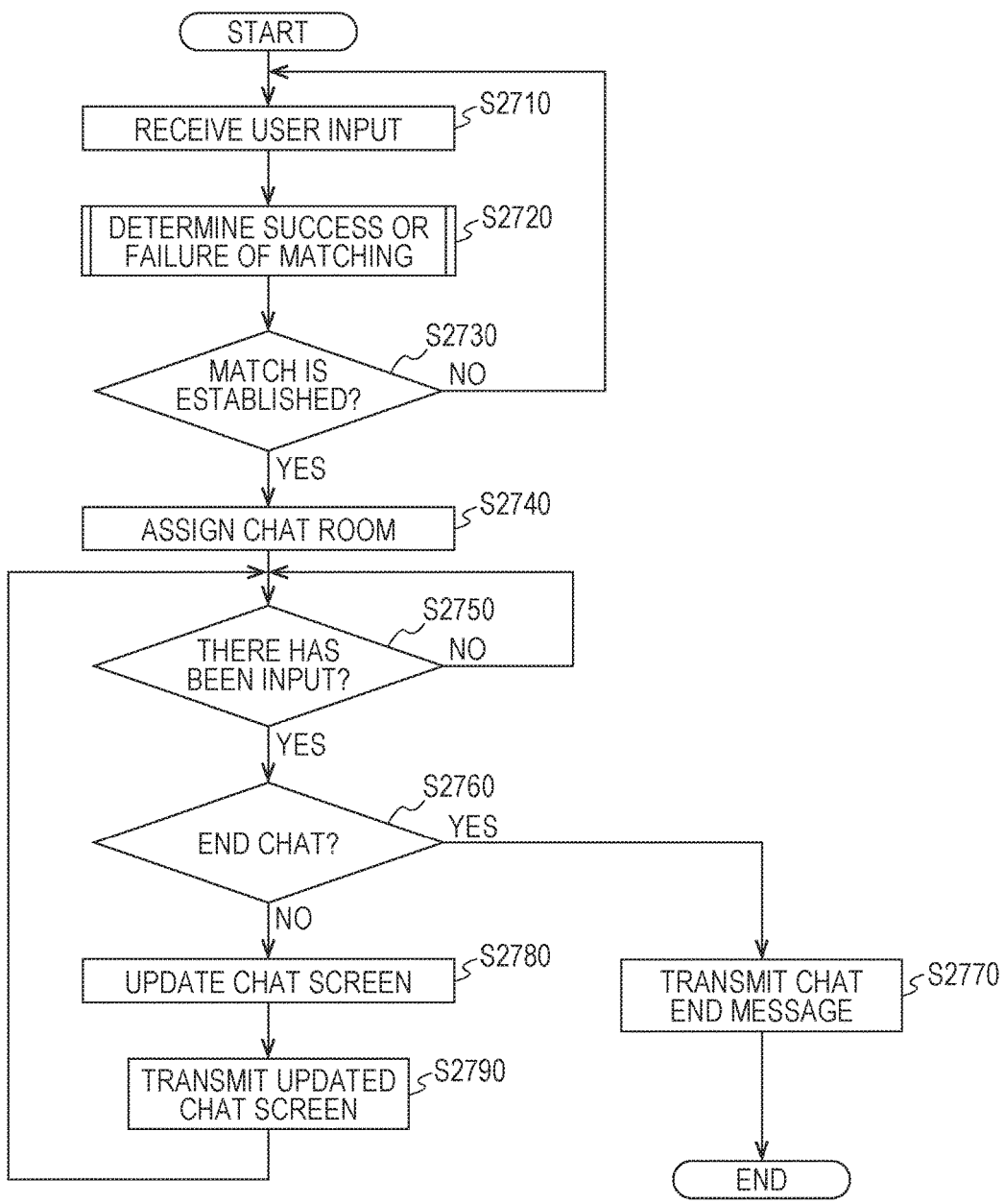
FIG. 27 A flowchart of processing for matching users in the matching system according to at least one embodiment of this disclosure.

FIG. 27 is a flowchart of processing for matching users in the matching system according to at least one embodiment of this disclosure. The processor 610 implements the processing by, for example, executing a program stored in the memory 620.

In FIG. 27, in Step S2710, the processor 610 receives information specifying a user input from the computer 200 of each HMD set 110 of the matching system.

Figure 28:
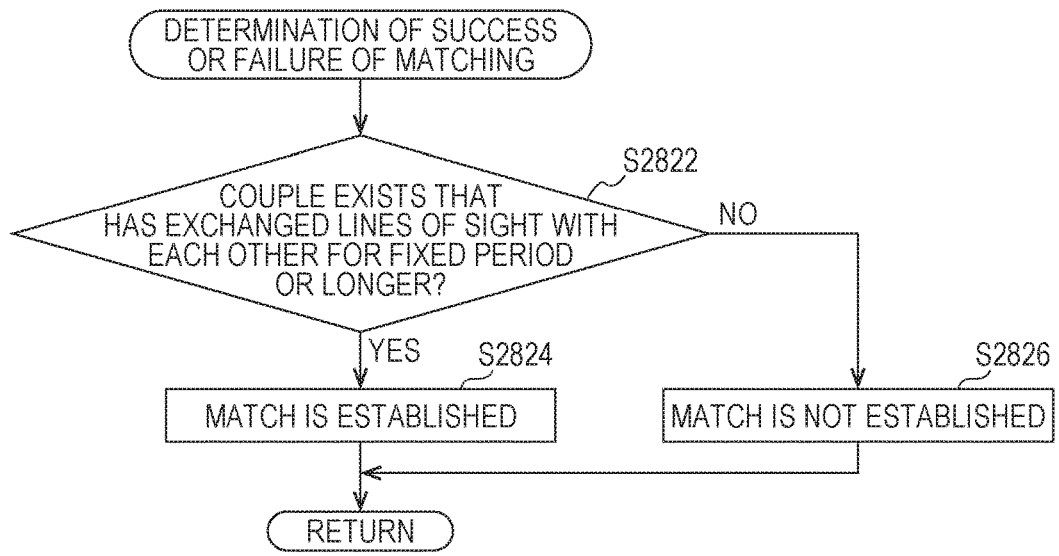
FIG. 28 A flowchart of an example of a sub-routine for determining success or failure of matching according to at least one embodiment of this disclosure.

In Step S2720, the processor 610 determines the success or failure of matching among the plurality of users of the matching system. FIG. 28 is a flowchart of a sub-routine for determining success or failure of matching in Step S2720 according to at least one embodiment of this disclosure.

In FIG. 28, in Step S2822, the processor 610 determines, based on the information received in Step S2710 (FIG. 27), whether or not there exists a couple (pair of users) who have exchanged lines of sight with each other for a fixed period or longer.

For example, when the user 5A has placed his/her point-of-gaze on the avatar corresponding to the user 5B for a fixed period or longer and the user 5B has placed his/her point-of-gaze on the avatar corresponding to the user 5A for a fixed period or longer, the processor 610 recognizes that the user 5A and the user 5B are a pair who have exchanged lines of sight with each other for a fixed period or longer. In at least one embodiment, in order to recognize the user 5A and the user 5B as such a pair, for the period during which the user 5A placed his/her point-of-gaze on the avatar corresponding to the user 5B, the user 5B placed his/her point-of-gaze on the avatar corresponding to the user 5A. In at least one embodiment, the overlapping of periods during which a user places his/her point-of-gaze on the avatar of the other member of a pair is not considered for establishing a pair.

In response to a determination that such a pair exists (YES in Step S2822), the processor 610 advances the control to Step S2824. In response to a determination that such a pair does not exist (NO in Step S2822), the processor 610 advances the control to Step S2826.

In Step S2824, the processor 610 determines that a match has been established, and returns the control to FIG. 27. In Step S2824, the processor 610 may also determine that two or more pairs have been matched.

In Step S2826, the processor 610 determines that a match has not been established, and returns the control to FIG. 27.

Returning to FIG. 27, in Step S2720, the processor 610 determines the success or failure of matching, and then advances the control to Step S2730.

In Step S2730, the processor 610 determines whether or not a match has been established based on the result of the determination in Step S2720. In response to a determination that a match has been established (YES in Step S2730), the processor 610 advances the control to Step S2740. In response to a determination that a match has not been established (NO in Step S2730), the processor 610 returns the control to Step S2710.

In Step S2740, the processor 610 assigns a chat room to each pair that has been matched in Step S2730. In at least one example, the processor 610 assigns a chat room created in advance to the matched user couples. In Step S2740, the processor 610 may transmit, to the computer 200 used by each user determined as having been matched, information (for example, uniform resource locator (URL)) for accessing the chat room assigned to that user. For the control after Step S2750, the server 600 may also function as a chat server executing control relating to the chat room.

A user who has been matched with another user is able to use the computer 200 to access the chat room. As a result, for example, a virtual space image like that in FIG. 18 is displayed on the monitor 130 of the HMD 120 used by the matched user. In the virtual space image, the avatar corresponding to the other user is displayed to the matched user.

The user accesses the chat room, operates the controller 300, and/or adjusts the direction of the HMD 120 worn by the user to control his/her point-of-gaze. In response to this, the computer 200 connected to the HMD 120 inputs information to the server 600.

In Step S2750, the processor 610 determines whether there has been input from the computer 200 operated by the user accessing the chat room. The processor 610 stops the control in Step S2750 until a determination is made that there has been input. In response to a determination that there has been input, the processor 610 advances the control to Step S2760.

In Step S2760, the processor 610 determines whether or not the input from the user is for ending the chat. In response to a determination that the input is for ending the chat (YES in Step S2760), the processor 610 advances the control to Step S2770. In response to a determination that the input is not for ending the chat (NO in Step S2760), the processor 610 advances the control to Step S2780.

In Step S2770, the processor 610 transmits, to each of the users of the chat to be ended by input, a message to end the chat. The processor 610 releases the assignment of the chat room to those users, and then ends the processing of FIG. 26.

In Step S2780, the processor 610 updates the screen of the chat that the users are participating in accordance with the information input from the users.

In Step S2790, the processor 610 transmits the image data for forming the screen of the updated chat to the computer 200 used by each of the users participating in the chat. As a result, the virtual space screen displayed on the monitor 130 of the HMD 120 of each user is updated.

With the processing of FIG. 27 described above, in the matching system, when two users gaze at each other's avatar fora fixed period or longer, those two users are matched. More specifically, in at least one embodiment, in order for the user 5A to be matched with the user 5B, the user 5A needs to place his/her point-of-gaze on the avatar corresponding to the user 5B for a fixed period or longer. Therefore, when the period during which the user 5A places his/her point-of-gaze on the avatar corresponding to the user 5B is only a short period that is less than the fixed period, the user 5A is not matched with the user 5B. Whether or not the user has placed his/her point-of-gaze on an avatar corresponding to another user for a fixed period or longer may be determined based on whether or not the line of sight of the user detected based on output from the eye gaze sensor 140 is directed at the avatar corresponding to the other user. This determination may also be performed based on whether or not the line of sight of the user is directed at the avatar corresponding to another user by considering a reference line of sight 16 determined based on motion of the head of the user wearing the HMD to be the line of sight of the user.

When a match is established, the two users enter the chat room set for those two users. The matching system provides an image of the chat room as a virtual space. As a result, the two matched people are able to enjoy a one-on-one conversation in the virtual space.

(Matching Success/Failure)

Figure 29:
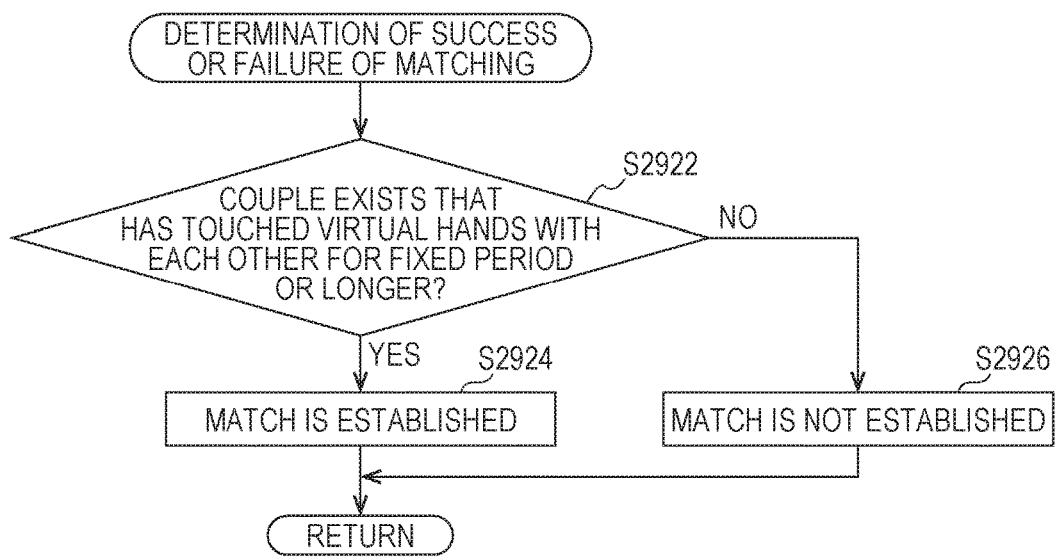
FIG. 29 A flowchart of an example of a sub-routine for determining success or failure of matching according to at least one embodiment of this disclosure.

FIG. 29 is a flowchart of an example of a sub-routine of Step S2720 of FIG. 27 according to at least one embodiment of this disclosure. The condition for establishing a match is not limited to the fact that a user has gazed at the avatar of another user in the virtual space for a fixed period or longer in FIG. 27. Another example of the subroutine of Step S2720 of FIG. 27 is now described with reference to FIG. 29.

In FIG. 29, in Step S2922, the processor 610 determines, based on the information received in Step S2710 (FIG. 27), whether or not there exists a couple (pair of users) that have touched each other with their virtual hands for a fixed period or longer.

For example, when the user 5A has executed an operation of touching with his/her virtual hand the avatar corresponding to the user 5B for a fixed period or longer and the user 5B has executed an operation of touching with his/her virtual hand the avatar corresponding to the user 5A for a fixed period or longer, the processor 610 recognizes that the user 5A and the user 5B are a couple who have touched each other with their virtual hands for a fixed period or longer. In at least one embodiment, in order to recognize the user 5A and the user 5B as such a couple, for the period during which the user 5A touched with his/her virtual hand the avatar corresponding to the user 5B, the user 5B touched with his/her virtual hand the avatar corresponding to the user 5A. In at least one embodiment, overlapping of periods of touching a virtual hand to an avatar is not considered for establishing a match.

In response to a determination that such a couple exists (YES in Step S2922), the processor 610 advances the control to Step S2924. In response to a determination that such a pair does not exist (NO in Step S2924), the processor 610 advances the control to Step S2926.

In Step S2924, the processor 610 determines that a match has been established, and returns the control to FIG. 27. In Step S2924, the processor 610 may also determine that two or more pairs have been matched.

In Step S2926, the processor 610 determines that a match has not been established, and returns the control to FIG. 27.

In the processing of FIG. 29, a match is established on condition that the avatar of another user is touched by a virtual hand for a fixed period or longer.

In the matching system according to at least one embodiment of this disclosure, a match is established on condition that any one of an avatar has been gazed at for a fixed period or longer in FIG. 28 and an avatar has been touched with a virtual hand for a fixed period or longer in FIG. 29.

(Notification Before Ending Chat Room)

Figure 30:
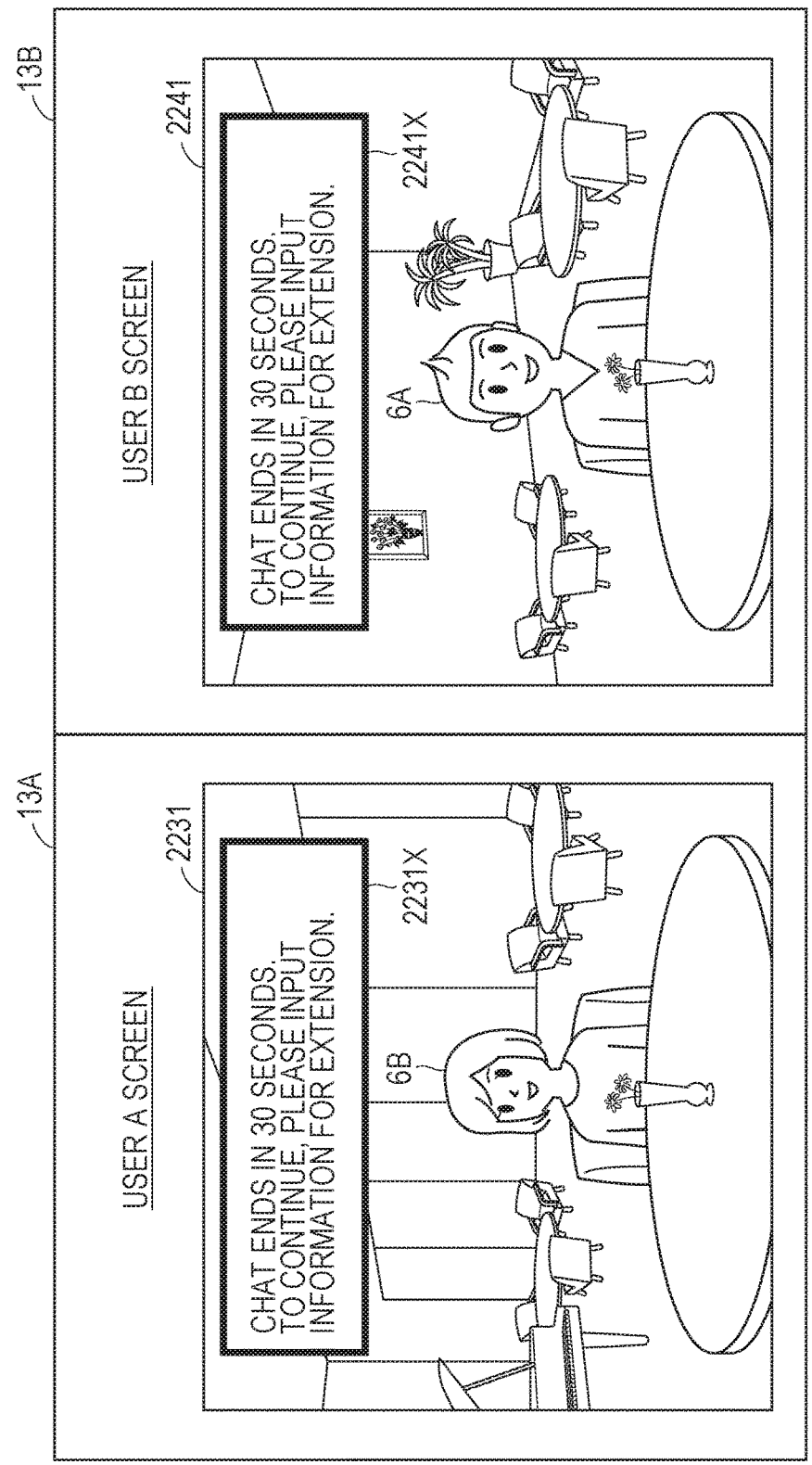
FIG. 30 A diagram of an example of a notification mode according to at least one embodiment of this disclosure.

FIG. 30 is a diagram of a notification before ending the chat room according to at least one embodiment of this disclosure. The processor 610 may end the chat room opened for the couple of matched users on condition that a predetermined time has elapsed since the opening of the chat room. In windows 2231X and 2241X in FIG. 30, at a timing determined in advance before an end time, the processor 610 may instruct display of information for informing that the end time of the display of the chat room has arrived (or is approaching).

Figure 31:
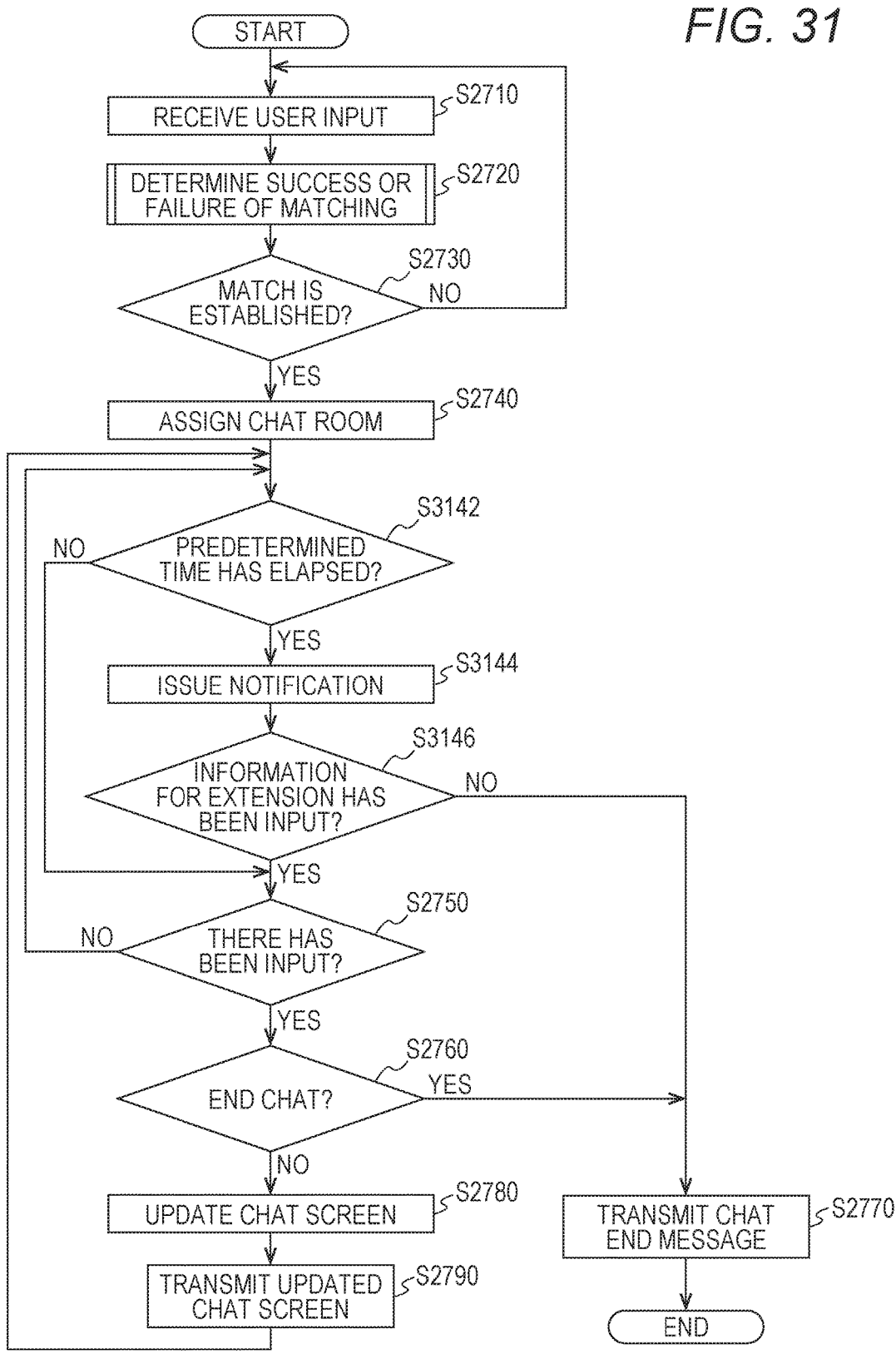
FIG. 31 A flowchart of an example of the processing of FIG. 27 according to at least one embodiment of this disclosure.

Processing performed in accordance with at least one aspect is now described with reference to FIG. 31. FIG. 31 is a flowchart of an example of the processing of FIG. 27 according to at least one embodiment of this disclosure. In this case, the processing described with reference to FIG. 27 is modified in the manner in FIG. 31.

The processing of FIG. 31 includes, compared with the processing of FIG. 27, the control of Steps S3142, S3144, and S3146. More specifically, after the chat room is opened in Step S2740, the processor 610 advances the control to Step S3142.

In Step S3142, the processor 610 determines whether or not the predetermined time has elapsed since the chat room was opened in Step S2740. In response to a determination that the predetermined time has not yet elapsed (NO in Step S3142), the processor 610 advances the control to Step S2750. In response to a determination that the predetermined time has elapsed (YES in Step S3142), the processor 610 advances the control to Step S3144.

In Step S3144, the processor 610 notifies the users of the chat room that the end of the chat room is approaching. As a result of this notification, for example, the messages displayed as windows 2231X and 2241X in FIG. 30 are displayed in the image displayed by the HMD 120 of each user.

In FIG. 30, there are the virtual space image 13A in the virtual space to be provided to the user 5A and the virtual space image 13B in the virtual space to be provided to the user 5B. The virtual space image 13A of FIG. 30 includes a window 2231X in an area 2231. The window 2231X displays a message "Chat ends in 30 seconds. To continue, please input information for extension". The virtual space image 13B includes a window 2231Y in an area 2241. The window 2231Y displays the same message as displayed in the window 2231X. More specifically, the processor 610 instructs the relevant HMD set 110 to display the relevant message. The monitor 130 of the HMD set 110 to which the instruction is transmitted displays that message.

In this example, the "information for extension" is information required to extend the time that the chat room is open, and is, for example, a key issued in response to payment of a fee. In at least one example, the server 600 issues the key in advance in response to payment of a fee by the user when the notification is issued in Step S3144. In order to extend the time that the chat room is open, the user inputs the key to the computer 200. The computer 200 transmits the input key to the server 600.

Returning to FIG. 31, in Step S3146, the processor 610 determines whether or not information for extension (key) has been input from the user. When there is no input of the information for extension, the processor 610 advances the control to Step S2770. When there is input of the information for extension, the processor 610 returns the control to Step S3142. In the control of the subsequent Step S3142, in place of determining whether or not a predetermined time has elapsed since the opening of the chat room in Step S2740, the processor 610 determines whether or not the end time extended as a result of the input of the information for extension has arrived.

In Step S2770, the processor 610 transmits an end message to both of the users who are chatting, releases the assignment of the chat rooms to those users, and then ends the processing of FIG. 31.

(Display of Message Based on Conversation Content)

The display of the message during the chat as described with reference to FIG. 30 and FIG. 31 may be controlled based on the content of the conversation in the chat room. In at least one example, the processor 610 analyzes the content of the conversation in the chat room.

The processor 610 may determine that the chat room is going well when the frequency of speech in the chat room is high (many utterances per fixed time). The processor 610 may also determine that the chat room is not going well when the frequency of speech in the chat room is low.

The processor 610 may determine that the chat room has a good atmosphere when the speech in the chat room includes positive keywords (e.g., "fun", "happy", "interesting", etc.) determined in advance. When the speech in the chat room does not include the positive keywords determined in advance, the processor 610 may determine that the chat room does not have a good atmosphere.

The processor 610 may change the content of the message displayed as the messages 2231X and 2241X (FIG. 30) in accordance with whether or not the chat room is going well and/or whether or not the chat room has a good atmosphere. In at least one example, the processor 610 may be configured to include the message "To continue, please input information for extension" in the messages 2231X and 2241X when the chat room is going well and/or the chat room has a good atmosphere, and to not include the message "To continue, please input information for extension" in the messages 2231X and 2241X when the chat room is not going well and/or the chat room does not have a good atmosphere. The message "To continue, please input information for extension" is an example of information for urging an operation for extending the time the chat room is open.

Depending on the situation in the chat room, the processor 610 may also display the message at a timing that is unrelated to the end time of the chat room. In at least one example, in response to a determination that the chat room does not have a good atmosphere, the processor 610 may display a message encouraging a user, such as "Try harder!" on the virtual space screen of each user, registration information associated with the user of the chat partner (hobbies, etc.), and/or information capable of promoting conversation, such as recent news relating to the registration information.

(Continuation of Chat Room)

In the processing described with reference to FIG. 30 and FIG. 31, the assignment of the chat room is released when the predetermined time has elapsed since the chat room was assigned to a given couple, or when the period extended by the input of information for extension has elapsed. The matching system may also end, or not end, the assignment of the chat room to the matched couple based on different conditions.

(Space to be Provided as Chat Room)

The matching system may also change the mode of the chat room to be provided in accordance with the number of times a matched user enters the chat room. More specifically, when the user enters the chat room, the processor 610 manages the entry frequency of the user by, for example, transmitting a cookie to the computer 200 used by the user. The processor 610 may also change the virtual space to be provided as the chat room in response to the number of times both users (or at least one of the users) of the matched couple have entered the chat room reaching a predetermined number of times. In one example, when the number of times the users have entered the chat room reaches a predetermined number of times, the processor 610 provides a virtual space customized in accordance with information associated with at least one of the users of the matched couple as the chat room.

Figure 32:
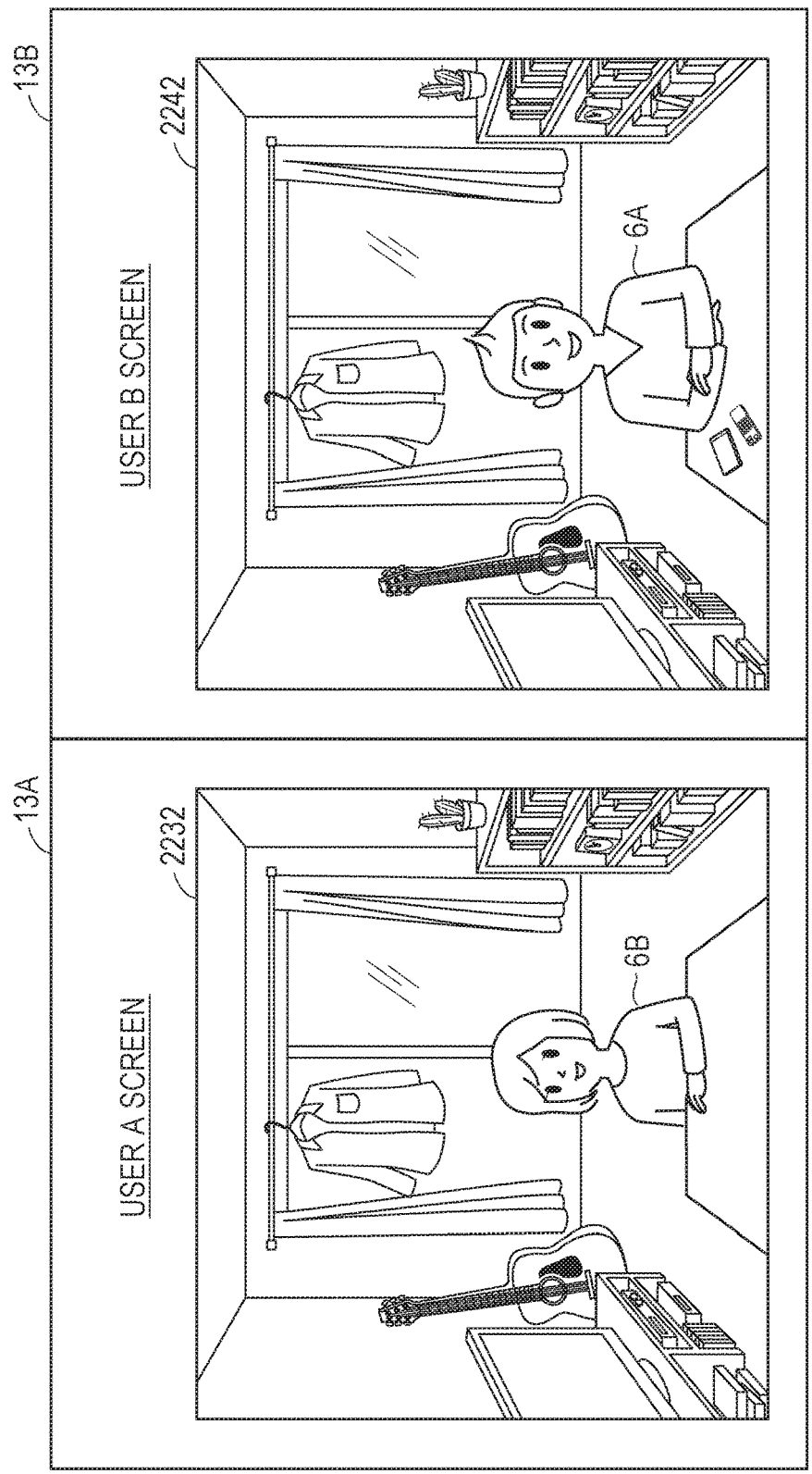
FIG. 32 A diagram of an example of the virtual space image representing the chat room to be provided according to at least one embodiment of this disclosure.

FIG. 32 is a diagram of an example of the virtual space image representing the chat room to be provided according to at least one embodiment of this disclosure. There is now described, with reference to FIG. 32, an example in which a chat room customized in accordance with user-associated information is provided to a matched user.

In FIG. 32, similarly to FIG. 18, there are illustrated the virtual space image 13A in the virtual space to be provided to the user 5A and the virtual space image 13B in the virtual space to be provided to the user 5B. Compared with the virtual spaces in FIG. 18, the virtual space image 13A and virtual space image 13B of FIG. 32 are customized in accordance with information associated with one of the users to whom the chat room is assigned.

Specifically, in the example of FIG. 32, a male user 5A represented by the avatar object 6A and a female user 5B represented by the avatar object 6B are matched. Both the virtual space image 13A and the virtual space image 13B in FIG. 32 represent rooms customized in accordance with information (e.g., "space setting" of FIG. 24) associated with the user 5A. More specifically, the interior of the room represented by each of the virtual space image 13A and the virtual space image 13B of FIG. 32 is customized in accordance with the type of interior registered in the "space setting" of FIG. 24 (interior of the type indicated as "room 02"). The rooms each include an item registered in the "space setting" of FIG. 24 (table of the type indicated as "table 01"). This enables the matching system to provide a sense that the user 5A and the user 5B are chatting in a private space of the user 5A.

Figure 33:
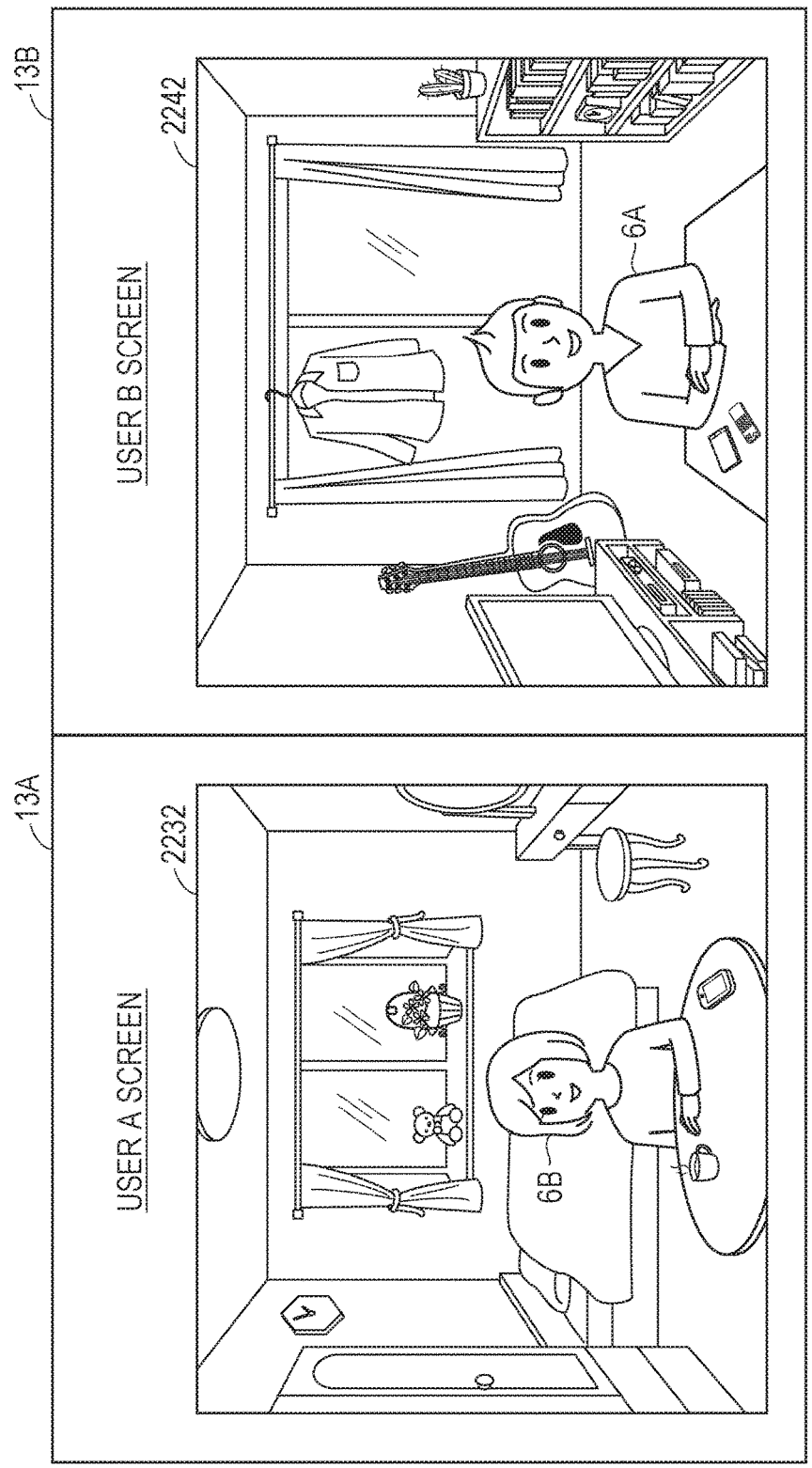
FIG. 33 A diagram of an example of the virtual space image representing the chat room to be provided according to at least one embodiment of this disclosure.

FIG. 33 is a diagram of an example of the virtual space image representing the chat room to be provided according to at least one embodiment of this disclosure. In the chat room, in at least one embodiment, the same virtual space is not provided to both users. There is now described, with reference to FIG. 33, an example in which, for users who are matched, the virtual space to be provided to one user is different from the virtual space to be provided to another user.

In FIG. 33, similarly to FIG. 32, there are the virtual space image 13A in the virtual space to be provided to the user 5A and the virtual space image 13B in the virtual space to be provided to the user 5B. In FIG. 33, the virtual space image 13A represents a space different from the virtual space image 13B. More specifically, the virtual space image 13A represents a space customized in accordance with the "space setting" for the user 5B, and the virtual space image 13B represents a space customized in accordance with the "space setting" for the user 5A. As a result, the matching system is able to provide the user 5A with a sense of chatting with the user 5B in a private space of the user 5B, and provide the user 5B with a sense of chatting with the user 5A in a private space of the user 5A. In other words, both users can be provided with a sense of chatting in the room of the other user.

The space specified by the information associated with the user is not limited to a private space of the user. In other words, information specifying a public space may be registered in the "space setting" of FIG. 24. An example of a public space is a famous amusement park. The user purchases a right to register that famous amusement park in the "space setting" by paying a predetermined fee to, for example, the operator of the matching system. This allows that user to designate the famous amusement park as a chat room with his/her matched partner. When a match has been established for a couple including that user on condition that the famous amusement park is registered in the "space setting" of that user, the processor 610 provides an image of a space representing the famous amusement park as the virtual space to be provided as a chat room.

(Display of Potential Matches Related to Viewed History)

Figure 34:
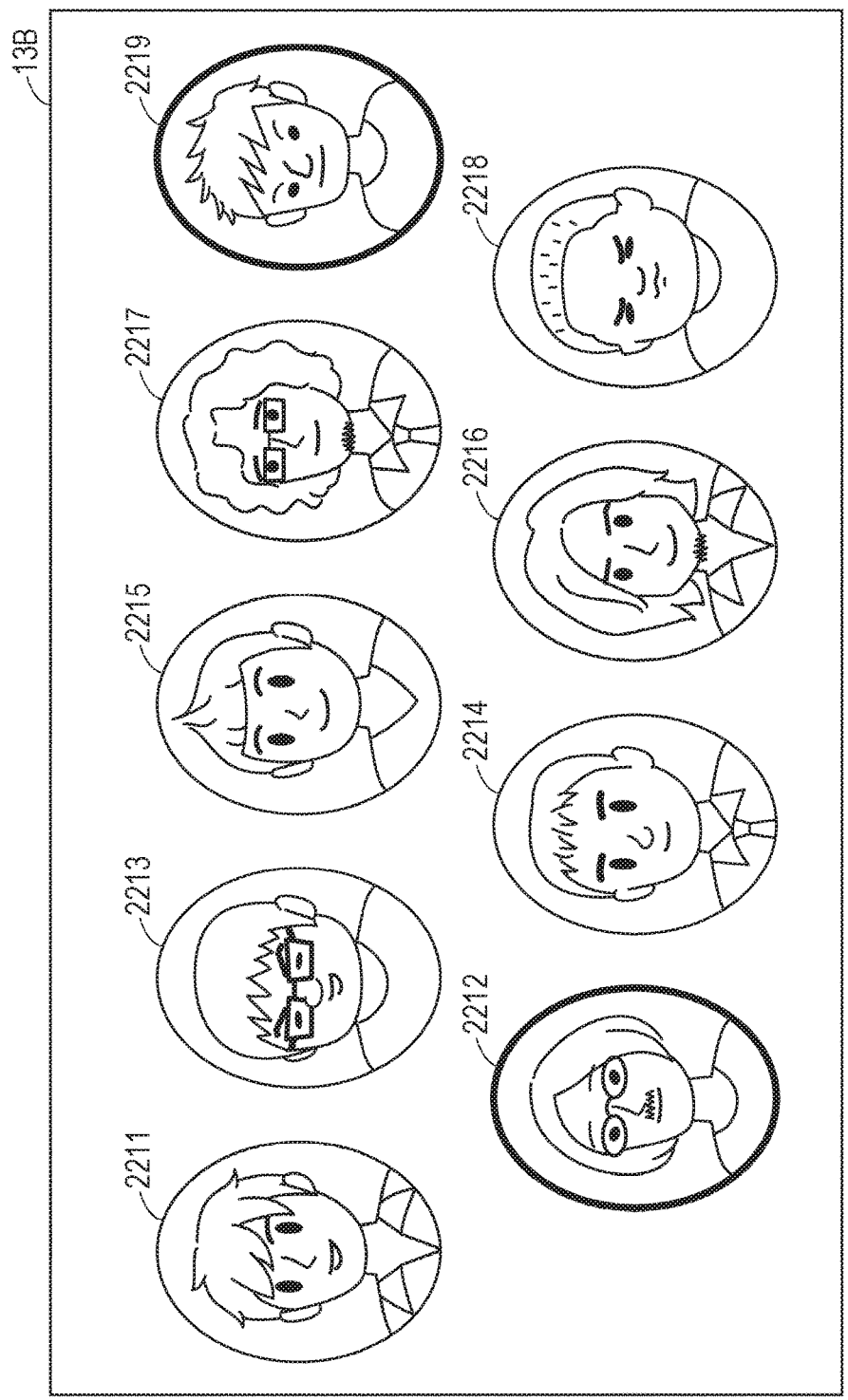
FIG. 34 A diagram of an example of the virtual space image according to at least one embodiment of this disclosure.

FIG. 34 is a diagram of an example of the virtual space image according to at least one embodiment of this disclosure. There is now described, with reference to FIG. 34, an example of a matching system in which the display of the potential match users described with reference to FIG. 34 is changed by using the viewed history (FIG. 23).

The virtual space image 13B of FIG. 34 emphasizes and displays the images 2212 and 2219 of the nine images 2211 to 2219. The avatars displayed in an emphasized manner are the avatars corresponding to the users registered as the viewer ID in the viewed history (FIG. 23).

Specifically, in the example of FIG. 34, in the virtual space screen provided to the user 5A, the avatars (images 2212 and 2219) representing each of the two users (IDs "000046" and "002013") registered in the viewed information (FIG. 23) of the user 5A as a result of designating the avatar of the user 5A are emphasized and displayed. This enables the user to which the virtual space image is provided to recognize a person who is interested in the user.

(Display of Potential Matches Based on Viewed History)

FIG. 35 is a diagram of an example of the virtual space image according to at least one embodiment of this disclosure. There is now described, with reference to FIG. 35, an example of a matching system in which the display of the potential match users described with reference to FIG. 35 is sequentially changed by using the viewed history (FIG. 23).

In the virtual space image 13B of FIG. 35, of the nine images 2211 to 2219, the image 2211 is displayed in a different mode from that of the images 2211 and 2212 to 2219. The avatar corresponding to the image 2211 is the avatar corresponding to the user who has just been registered as the viewer ID in the viewed history (FIG. 23).

Specifically, in the example of FIG. 35, in the virtual space screen to be provided to the user 5B, when the avatar of the user 5B is designated by another user, the avatar (image 2211) representing the other user is displayed in a mode different from the other avatars. This different mode is continued for a fixed period, or is continued during the period that the other user designates the user 5B. As a result, the user provided with the virtual space image is able to sequentially recognize that another user is interested in the user. In this way, whether or not another user is interested in the user can be translated in real time. For example, the user is able to recognize that another user has placed his/her point-of-gaze on the user's avatar, namely, the user is able to recognize that another user is gazing at the user.

(Selection of Potential Matches Using Viewed History)

The matching system may use the viewed history (FIG. 23) in order to determine the potential matches. More specifically, in the selection of the potential matches for a given user (Step S2603 of FIG. 26), the server 600 may include the users registered in the viewed history of that user as potential matches. As a result, even when there is an upper limit on the number of potential matches for a given user, the users registered in the viewed history of that user are included in the potential matches.

[Details of at Least One Embodiment of this Disclosure]

The disclosed technical features of at least one embodiment include, for example, the following configurations.

(Configuration 1)

There is provided a method in which a computer 200 provides a virtual space to an HMD set 110. The method includes detecting (Step S2601 of FIG. 26 and Step S2710 of FIG. 27) inputs from users who are using the HMD set 110 are detected based on motion by the users. The method further includes selecting (Step S2603 of FIG. 26) potential match users for each user from among the plurality of users. The method further includes displaying (Step S2605 of FIG. 26, FIG. 16, and FIG. 17) a virtual space including information representing the potential match users for each user on the display of the head-mounted device used by each of the plurality of users. The method further includes determining (Step S2824 of FIG. 28 and Step S2924 of FIG. 29), based on the detected inputs, whether a period during which a first user among the plurality of users designates a second user among the plurality of users and a period during which the second user designates the first user satisfy a relation determined in advance, and when it is determined that the relation is satisfied, establishing a match between the first user and the second user.

(Configuration 2)

According to at least one embodiment, the information representing the user includes an object (avatar), and the detected input may include input for placing a point-of-gaze on the object of the user (FIG. 28).

(Configuration 3)

According to at least one embodiment, the information representing the user includes an object (avatar), and the detected input includes input for touching the object of the user with a virtual hand (FIG. 29).

(Configuration 4)

According to at least one embodiment, in response to the second user being matched with the first user, a chat room for the first user and the second user is opened (Step S2740 of FIG. 27).

According to at least one embodiment, a time limit is set for the chat room (Step S3142 of FIG. 31). According to at least one embodiment, the head-mounted device (HMD 120) to be used by at least one of the first user or the second user is instructed to display information for urging an operation for extending the time the chat room is open at a timing determined in advance that is before the arrival of the time limit (Step S2770 of FIG. 30 and FIG. 31).

According to at least one embodiment, the transmission of information for urging the operation for the extension is executed on condition that conversation in the chat room satisfies a condition determined in advance (use of analysis result of conversation in chat room).

(Configuration 5)

According to at least one embodiment, when opening the chat room, a virtual space including image data that depends on information associated with the users of the chat room is generated (customization in accordance with background of chat room and user information on item).

(Configuration 6)

According to at least one embodiment, the fact that the chat room between the first user and the second user has been opened a predetermined number of times or more is set as a condition when generating the virtual space including image data that depends on information associated with the first user (chat in private space in accordance with management of number of times users enter chat room).

According to at least one embodiment, the information (FIG. 19 to FIG. 24) associated with the user using the head-mounted device is changed in accordance with input from the user to the computer 200.

According to at least one embodiment, regarding the display of information (e.g., an avatar) representing the potential match users, the information representing each user is adjusted in accordance with the information (e.g., "avatar setting" of FIG. 24) associated with each user.

(Configuration 7)

According to at least one embodiment, regarding the display of information representing potential match users, the number of users for which information is to be displayed is limited to a number determined in advance within a period determined in advance ("daily viewing count setting" of FIG. 21).

According to at least one embodiment, the number determined in advance relating to the limit is changed based on input to the computer 200 detected by the server 600.

According to at least one embodiment, the potential match users are selected from users belonging to a range ("priority introduction setting" of FIG. 22) in accordance with the information associated with the users who are using the head-mounted devices displaying information.

(Configuration 8)

According to at least one embodiment, when selecting the potential match users, users who have input a designation of a user who uses the head-mounted device displaying information are included in the potential matches (selection of potential matches using viewed history).

(Configuration 9)

According to at least one embodiment, the information representing the potential match users is displayed in a mode in which the information representing a user who has designated a user who uses a head-mounted device displaying information is different from the information representing other users (FIG. 34).

According to at least one embodiment, in the above-mentioned method, the information representing the potential match users is displayed in a mode in which the information representing a user who is designating a user who uses a head-mounted device displaying information is different from the information representing other users (FIG. 35).

(Configuration 10)

According to at least one embodiment, in the above-mentioned method, the display of the information representing the potential match users is information in which a display mode of the information representing each of the plurality of users is associated with each user ("priority arrangement setting" of FIG. 22).

In at least one embodiment, the display mode of the avatar of each user in the display of the potential matches is not limited to the mode shown in the virtual space image illustrated in FIG. 18 and the like. The arrangement of the avatars and the size and/or shape of each avatar may be changed as appropriate. This change may be performed in accordance with the information associated with each user.

In at least one embodiment, matching between a user wearing the HMD 120 and another user has been described. However, in the matching system according to at least one embodiment of this disclosure, a person wearing the HMD 120 may wear the HMD 120 in place of an object to be matched. More specifically, for example, a pet owner may wear the HMD 120 in order to match pets. In this case, in the opened chat room, for example, the owners of the matched pets may talk with each other.

It is to be understood that each of the embodiments disclosed herein is merely an example in all aspects and in no way intended to limit this disclosure. The scope of this disclosure is defined by the appended claims and not by the above description, and it is intended that this disclosure encompasses all modifications made within the scope and spirit equivalent to those of the appended claims. Further, this disclosure described in each of the embodiments and each of the modification examples is intended to be implemented independently or in combination to the maximum extent possible.

In the at least one embodiment described above, the description is given by exemplifying the virtual space (VR space) in which the user is immersed using an HMD. However, a see-through HMD may be adopted as the HMD. In this case, the user may be provided with a virtual experience in an augmented reality (AR) space or a mixed reality (MR) space through output of a field-of-view image that is a combination of the real space visually recognized by the user via the see-through HMD and a part of an image forming the virtual space. In this case, action may be exerted on a target object in the virtual space based on motion of a hand of the user instead of the operation object. Specifically, the processor may identify coordinate information on the position of the hand of the user in the real space, and define the position of the target object in the virtual space in connection with the coordinate information in the real space. With this, the processor can grasp the positional relationship between the hand of the user in the real space and the target object in the virtual space, and execute processing corresponding to, for example, the above-mentioned collision control between the hand of the user and the target object. As a result, an action is exerted on the target object based on motion of the hand of the user.

The invention claimed is:

1. A method, comprising:
    defining a first virtual space, wherein the first virtual space is associated with a first user to be associated with a first head-mounted device (HMD);
    defining a second virtual space, wherein the second virtual space is associated with a second user, different from the first user, to be associated with a second head-mounted device (HMD);
    specifying a plurality of first potential match users as candidates to be matched with the first user, wherein the plurality of first potential match users comprise the second user;
    presenting in the first virtual space information representing the plurality of first potential match users;
    detecting a first input from the first user;
    detecting a first period during which the first user designates the second user in accordance with the detected first input;
    specifying a plurality of second potential match users as candidates to be matched with the second user, wherein the plurality of second potential match users comprise the first user;
    presenting in the second virtual space information representing the plurality of second potential match users;
    detecting a second input from the second user;
    detecting a second period during which the second user designates the first user in accordance with the detected second input; and
    matching the first user and the second user in accordance with the first period and the second period satisfying a predetermined relation.

2. The method according to claim 1, wherein the relation comprises the first period and the second period overlapping for at least a predetermined time.

3. The method according to claim 1,
    wherein the first virtual space comprising the information representing the plurality of first potential match users further comprises a first object overlaying at least one first potential match user of the plurality of first potential match users.

4. The method according to claim 3,
wherein the first period comprises a continuous period in which a line of sight of the first user is directed toward the first object.

5. The method according to claim 3,
wherein the first virtual space comprising the first object further comprises a second object.

6. The method according to claim 5, further comprising moving the second object in accordance with a detected motion of the first user.

7. The method according to claim 6, The method according to claim 6, wherein the presenting in the first virtual space the information representing the plurality of first potential match users comprises presenting the second user in a second mode, different from the first mode, in response to a determination that the second user is designating the first user.

8. The method according to claim 5,
wherein the first period comprises a continuous period in which a position of the second object and overlaps a position of the first object.

9. The method according to claim 1,
wherein the detecting of the input from the first user comprises detecting a line of sight of the first user.

10. The method according to claim 1,
wherein the detecting of the input from the first user comprises detecting a motion by a part of a body of the first user.

11. The method according to claim 1, further comprising:
generating a chat room in response to matching of the first user and the second user; and
associating only the first user and the second user with the chat room.

12. The method according to claim 11, further comprising:
arranging image data corresponding to the second user in the chat room in response to the first user being associated with the chat room; and
displaying on the first HMD a visual-field image of inside the chat room including the image data.

13. The method according to claim 11, further comprising:
storing a count of a number of times the chat room with which only the first user and the second user are associated has been generated; and
arranging the image data in the chat room in response to the chat room being generated at least a predetermined number of times.

14. The method according to claim 1, wherein the presenting in the first virtual space comprises presenting the second user in response to a determination that the second user has designated the first user and that the predetermined relation is not satisfied.

15. The method according to claim 1, wherein the presenting in the first virtual space the information representing the plurality of first potential match users comprises presenting the information representing the each first potential match user of the plurality of first potential match users in a first mode.

16. The method according to claim 15, wherein the presenting in the first virtual space the information representing the plurality of first potential match users comprises presenting the second user in a second mode, different from the first mode, in response to a determination that the second user has designated the first user and that the predetermined relation is not satisfied.

17. The method according to claim 1, wherein a mode in which the second user is displayed as one of the plurality of first potential match users in the first virtual space is emphasized in response to a determination that a number of times the second user has designated the first user has increased.

18. The method according to claim 1, wherein a mode in which the second user is displayed as one of the plurality of first potential match users in the first virtual space is emphasized in response to a determination that a length of the second period has increased.

19. A system, comprising:
a non-transitory computer readable medium configured to store a program; and
a processor connected to the non-transitory computer readable medium, wherein the processor is configured to execute the program for:
defining a first virtual space, wherein the first virtual space is associated with a first user to be associated with a first head-mounted device (HMD);
defining a second virtual space, wherein the second virtual space is associated with a second user, different from the first user, to be associated with a second head-mounted device (HMD);
defining a first avatar to be associated with the first user and a second avatar to be associated with the second user;
specifying a plurality of first potential match users as candidates to be matched with the first user, wherein the plurality of first potential match users comprise the second user;
instructing the first HMD to present in the first virtual space information representing the plurality of first potential match users;
detecting a first input from the first user;
detecting a first period during which the first user designates the second user in accordance with the detected first input;
specifying a plurality of second potential match users as candidates to be matched with the second user, wherein the plurality of second potential match users comprise the first user;
instructing the second HMD to present in the second virtual space information representing the plurality of second potential match users;
detecting a second input from the second user;
detecting a second period during which the second user designates the first user in accordance with the detected second input; and
matching the first user and the second user in accordance with the first period and the second period satisfying a predetermined relation, wherein the predetermined relation comprises detecting the first avatar contacting the second avatar for at least a predetermined amount of time.

20. A method, comprising:
defining a plurality of virtual spaces, wherein each of the plurality of virtual spaces is associated with a corresponding user to be associated with a corresponding head-mounted device (HMD);
specifying a plurality of potential match users for each of the plurality of virtual spaces;
presenting in the corresponding virtual space information representing the plurality of potential match users associated with each of the plurality of virtual spaces;
defining an avatar and line of sight associated with a first user in the virtual space of the first user;

defining an avatar and a line of sight associated with a second user in the virtual space of the second user;

detecting a first input from the first user associated with a first virtual space of the plurality of virtual spaces, wherein the detecting of the first input comprises determining a duration of the first input;

detecting a second input from a second user associated with a second virtual space of the plurality of virtual spaces, wherein the detecting of the second input comprises determining a duration of the second input; and matching the first user and the second user in accordance with the first input and the second input satisfying a predetermined relation, wherein the predetermined relation comprises the line of sight of the first user intersecting with the avatar of the second user for at least a predetermined amount of time, and the line of sight of the second user intersecting with the avatar of the first user for at least a predetermined amount of time.

* * * * *